United States Patent
Robles Flores et al.

(10) Patent No.: US 10,201,930 B2
(45) Date of Patent: Feb. 12, 2019

(54) ACOUSTIC TRANSFUDE 3-D PRINTING

(71) Applicant: Xerox Corporation, Norwalk, CT (US)

(72) Inventors: Eliud Robles Flores, Rochester, NY (US); David S. Derleth, Webster, NY (US); David C. Craig, Pittsford, NY (US); John S. Facci, Webster, NY (US); Varun Sambhy, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 380 days.

(21) Appl. No.: 15/147,997

(22) Filed: May 6, 2016

(65) Prior Publication Data

US 2017/0320269 A1 Nov. 9, 2017

(51) Int. Cl.
G03G 15/16 (2006.01)
G03G 13/16 (2006.01)
(Continued)

(52) U.S. Cl.
CPC .......... B29C 64/223 (2017.08); B29C 64/141 (2017.08); B29C 64/245 (2017.08); B29C 64/30 (2017.08); B33Y 10/00 (2014.12); B33Y 30/00 (2014.12); G03G 13/14 (2013.01); G03G 13/16 (2013.01); G03G 15/161 (2013.01);
(Continued)

(58) Field of Classification Search
CPC ........ G03G 13/14; G03G 13/16; G03G 15/14; G03G 15/16; G03G 15/1605; G03G 15/161; G03G 15/1625; G03G 15/1665; G03G 15/167; G03G 15/168; G03G 15/169; B29C 64/141; B29C 64/153; B29C 64/205;
(Continued)

(56) References Cited

U.S. PATENT DOCUMENTS 4,063,808 A 12/1977 Simpson
4,100,884 A 7/1978 Mochizuki et al.
(Continued)

FOREIGN PATENT DOCUMENTS

CN 104890241 A 9/2015
WO 2015133641 A1 9/2015

OTHER PUBLICATIONS

U.S. Appl. No. 15/147,971, Office Action Communication dated Jun. 26, 2018, pp. 1-11.
(Continued)

*Primary Examiner* — Atul P. Khare
(74) *Attorney, Agent, or Firm* — Gibb & Riley, LLC

(57) ABSTRACT

3-D printers include a transfuse station having at least one roller on one side of an ITB supporting the ITB, and a transmission device on the same side of the ITB. A charge neutralizer is included on a second side of the intermediate transfer surface. The charge neutralizer outputs an opposite charge to neutralize existing static charge on a layer of the build material and the support material on the ITB, before the layer reaches the transfer station. Additionally, the intermediate transfer surface transfers the layer to a platen each time the platen contacts the second side of the intermediate transfer surface, at the transfer station, to successively form layers of the build material and the support material on the platen. Also, the transmission device outputs acoustic waves to cause the layer to move from the intermediate transfer surface to the platen, or to the layers on the platen.

7 Claims, 29 Drawing Sheets

(51) Int. Cl.
*B29C 64/223* (2017.01)
*B33Y 10/00* (2015.01)
*B33Y 30/00* (2015.01)
*B29C 64/245* (2017.01)
*B29C 64/30* (2017.01)
*G03G 13/14* (2006.01)
*G03G 15/22* (2006.01)
*B29C 64/141* (2017.01)

(52) U.S. Cl.
CPC ....... *G03G 15/169* (2013.01); *G03G 15/1625* (2013.01); *G03G 15/225* (2013.01)

(58) Field of Classification Search
CPC ... B29C 64/223; B29C 64/245; B29C 64/307; B29C 64/314; B29C 64/321; B29C 64/336
See application file for complete search history.

(56) References Cited

U.S. PATENT DOCUMENTS

| | | | |
|---|---|---|---|
| 4,187,774 A | 2/1980 | Iwasa et al. | |
| 4,510,223 A | 4/1985 | Kuehnle et al. | |
| 4,987,456 A * | 1/1991 | Snelling | G03G 15/16 399/319 |
| 5,016,055 A | 5/1991 | Pietrowski et al. | |
| 5,088,047 A | 2/1992 | Bynum | |
| 5,103,263 A * | 4/1992 | Moore | G03G 15/167 101/DIG. 37 |
| 5,282,006 A | 1/1994 | Fletcher | |
| 5,339,147 A * | 8/1994 | Snelling | G03G 15/2064 399/333 |
| 5,477,315 A * | 12/1995 | Mashtare | B82Y 15/00 399/296 |
| 5,966,559 A * | 10/1999 | May | G03G 15/167 399/303 |
| 6,066,285 A | 5/2000 | Kumar | |
| 6,141,524 A * | 10/2000 | Berkes | G03G 15/161 399/307 |
| 6,157,804 A * | 12/2000 | Richmond | G03G 15/16 310/311 |
| 6,775,504 B2 | 8/2004 | Godlove et al. | |
| 7,184,698 B2 | 2/2007 | Tombs | |
| 7,250,238 B2 | 7/2007 | Fromm et al. | |
| 7,270,408 B2 | 9/2007 | Odell et al. | |
| 7,851,549 B2 | 12/2010 | Sacripante et al. | |
| 8,265,536 B2 | 9/2012 | Condello et al. | |
| 8,306,443 B2 | 11/2012 | DiRubio et al. | |
| 8,396,404 B2 | 3/2013 | Tabb et al. | |
| 8,470,231 B1 | 6/2013 | Dikovsky et al. | |
| 8,488,994 B2 | 7/2013 | Hanson et al. | |
| 8,548,621 B2 | 10/2013 | Gross et al. | |
| 8,718,522 B2 * | 5/2014 | Chillscyzn | G03G 15/169 399/307 |
| 8,836,911 B2 * | 9/2014 | Flores | G03G 15/1635 355/22 |
| 8,879,957 B2 | 11/2014 | Hanson et al. | |
| 9,029,058 B2 | 5/2015 | Martin | |
| 9,193,110 B2 | 11/2015 | Pridoehl et al. | |
| 2008/0131800 A1 | 6/2008 | Marsh et al. | |
| 2010/0140849 A1 | 6/2010 | Comb et al. | |
| 2010/0227184 A1 | 9/2010 | Swift et al. | |
| 2012/0276233 A1 | 11/2012 | Napendensky | |
| 2013/0075013 A1 | 3/2013 | Chillscyzn et al. | |
| 2013/0078013 A1 | 3/2013 | Chillscyzn et al. | |
| 2013/0186558 A1 | 7/2013 | Comb et al. | |
| 2014/0134334 A1 | 5/2014 | Pridoehl et al. | |
| 2015/0024169 A1 | 1/2015 | Martin | |
| 2015/0024309 A1 | 1/2015 | Martin | |
| 2015/0024317 A1 | 1/2015 | Drrock et al. | |
| 2015/0142159 A1 | 5/2015 | Chang | |
| 2015/0145174 A1 | 5/2015 | Comb | |
| 2015/0266241 A1 | 9/2015 | Batchelder | |
| 2015/0352786 A1 | 12/2015 | Pruett et al. | |
| 2016/0243764 A1 | 8/2016 | Hays et al. | |
| 2017/0015063 A1 * | 1/2017 | Hanyu | B33Y 10/00 |
| 2017/0192377 A1 | 7/2017 | Batchelder et al. | |
| 2017/0299973 A1 | 10/2017 | Frauens | |

OTHER PUBLICATIONS

European Application No. 17169600.8, European Search Report dated Sep. 7, 2017, pp. 1-7.
U.S. Appl. No. 15/152,659, Restriction Requirement dated Dec. 26, 2017, pp. 1-6.
U.S. Appl. No. 15/152,659, Office Action Communication dated Feb. 22, 2018, pp. 1-16.
U.S. Appl. No. 15/152,659, Office Action Communication dated Jun. 19, 2018, pp. 1-20.
U.S. Appl. No. 15/152,659, Advisory Action dated Aug. 28, 2018, pp. 1-3.
U.S. Appl. No. 15/152,631, Restriction Requirement dated Nov. 15, 2017, p. 1-7.
U.S. Appl. No. 15/152,631, Office Action Communication dated Dec. 20, 2017, pp. 1-9.
U.S. Appl. No. 15/152,631, Office Action Communication dated May 2, 2018, pp. 1-26.
U.S. Appl. No. 15/152,631, Notice of Allowance Communication dated Jul. 6, 2018, pp. 1-8.
U.S. Appl. No. 15/152,659, Notice of Allowance dated Oct. 3, 2018, pp. 1-6.
U.S. Appl. No. 15/147,971, Notice of Allowance dated Oct. 4, 2018, pp. 1-7.
U.S. Appl. No. 16/059,496, Office Action Communication dated Dec. 13, 2018, pp. 1-10.

* cited by examiner

ACOUSTIC TRANSFUDE 3-D PRINTING

BACKGROUND

Systems and methods herein generally relate to three-dimensional (3-D) printing processes that use electrostatic printing processes.

Three-dimensional printing can produce objects using, for example, ink-jet printers and UV-curable material. In many systems, a platform moves below an ink-jet to form a layer of build and support materials, and each layer is hardened using a UV light source. These steps are repeated layer-by-layer. Support materials generally comprise acid-, base- or water-soluble polymers, which can be selectively rinsed from the build material after 3-D printing is complete.

The electrostatic (electro-photographic) process is a well-known means of generating two-dimensional digital images, which transfer materials onto an intermediate surface (such as a photoreceptor belt or drum). Advancements in the way an electro-photographic image is transferred can leverage the speed, efficiency and digital nature of printing systems.

SUMMARY

Exemplary three-dimensional (3-D) printers include, among other components, an intermediate transfer surface (such as an intermediate transfer belt (ITB), or other photoreceptor), a first development station positioned to electrostatically transfer build material to the intermediate transfer surface, and a second development station positioned to electrostatically transfer support material to a location of the intermediate transfer surface where the build material is located on the intermediate transfer surface. Each of the layers is on a discrete area of the intermediate transfer surface and is in a pattern. The support material dissolves in solvents that do not affect the build material.

Additionally, in order to conserve the amount of support material used, the second development station can form the pattern of support material that surrounds the build material to only have a specific thickness (where this "specific thickness" is measured in a direction parallel to the intermediate transfer surface) and to not be thicker or thinner than the specific thickness. Thus, with methods and devices herein, just enough support material is used around the build material to keep the build material in the pattern created by the first development station, at least through the processing point where the build material is transferred off the intermediate transfer surface.

Such printers also include a transfer station that can include, for example, at least one roller, on a first side of the intermediate transfer surface, supporting the intermediate transfer surface, and a transmission device on the same "first" side of the intermediate transfer surface. A charge neutralizer is included on a second side of the intermediate transfer surface (the first side of the intermediate transfer surface is opposite the second side). The charge neutralizer outputs an opposite charge to neutralize existing electrostatic charge on a layer of the build material and the support material on the intermediate transfer surface, before the layer reaches the transfer station.

Additionally, a platen moves relative to the intermediate transfer surface. The intermediate transfer surface transfers the layer to the platen each time the platen contacts the second side of the intermediate transfer surface, at the transfer station, to successively form layers of the build material and the support material on the platen. The transmission device outputs acoustic waves cause the layer to move from the intermediate transfer surface to the platen, or to the layers on the platen. The transmission device is an acoustic device vibrating the intermediate transfer surface using acoustic waves. Thus, the transmission device physically vibrates (or acoustically drives) the layers off the intermediate transfer surface and on to the platen, or on to the layers that have been previously transferred to the platen.

Other features include an fuser/heater that is positioned to heat the layers and join each of the layers together after the layers have been transferred to the platen by the transfer station and/or a similar fuser/pressure roller positioned to press each of the layers together after the layers have been transferred to the platen by the transfer station. Further, a curing station can be positioned to apply light to the layers to cure the layers to one another on the platen. Also, a support material removal station can be positioned to receive the layers. The support material removal station can apply a solvent that dissolves the support material (without affecting the build material) to leave the layers made of only the build material.

Exemplary three-dimensional (3-D) printing methods herein electrostatically transfer build material to an intermediate transfer surface using a first development station, and electrostatically transfer support material to a location of the intermediate transfer surface where the build material is located on the intermediate transfer surface, using a second development station. A solvent dissolves the support material (without affecting the build material) to leave the layers made of only the build material.

More specifically, in such processing, these methods control the second development station to form a pattern of the support material around the build material within each of the layers to have a specific thickness. The specific thickness is in a direction parallel to the intermediate transfer surface. Thus, these methods can control the second development station to form the pattern of the support material around the build material to only have the specific thickness, and to not be thicker or thinner than the specific thickness.

Such methods can also output an opposite charge to neutralize existing static charge on a layer of the build material and the support material on the intermediate transfer surface, before the layer reaches a transfer station. As noted above, the transfer station can include, for example, at least one roller on a first side of the intermediate transfer surface, supporting the intermediate transfer surface, and a transmission device on the first side of the intermediate transfer surface. The charge neutralizer is on a second side of the intermediate transfer surface, and the first side is opposite the second side.

Such methods move a platen to contact the intermediate transfer surface. The intermediate transfer surface transfers the layer to the platen each time the platen contacts the second side of the intermediate transfer surface at the transfer station to successively form layers of the build material and the support material on the platen. Additionally, these methods output acoustic waves from the transmission device to cause the layer to move from the intermediate transfer surface to the platen, or to the existing layers on the platen. More specifically, the transmission device is an acoustic device vibrating the intermediate transfer surface using acoustic waves, and these methods can control the transmission device to physically vibrate the layers off the intermediate transfer surface and on to the platen, or on to the layers on the platen.

After transfer, such methods can use a heater to heat the layers to join each of the layers together after the layers have been transferred to the platen by the transfer station and/or a use a pressure roller to press each of the layers together after the layers have been transferred to the platen by the transfer station. Further, these methods can use a curing station to apply light to the layers to cure the layers to one another on the platen. Additionally, such methods can apply a solvent that dissolves the support material (without affecting the build material) to leave the layers made of only the build material.

These and other features are described in, or are apparent from, the following detailed description.

BRIEF DESCRIPTION OF THE DRAWINGS

Various exemplary systems and methods are described in detail below, with reference to the attached drawing figures, in which.

DETAILED DESCRIPTION

As mentioned above, electrostatic printing process are well-known means of generating two-dimensional (2-D) digital images, and the methods and devices herein use such processing for the production of 3-D items (for 3-D printing). However, when performing 3-D printing using electrostatic processes (especially those that use an ITB), the mechanical integrity of the printed material may be compromised if it is very thin, and the transfer process can impose stripping shear forces that damage or smear the material. Also, transfer of newly developed layers on the ITB to the existing layers on the platen can become difficult using only electrostatic forces, especially as the stack of layers on the platen grows and becomes taller.

In view of these and other issues, the methods and devices herein use acoustic vibrational energy to launch build and support material across small transfer gaps, from the ITB and onto the previously formed 3-D part layers, and such is especially useful when the previously formed 3-D part layers have high formation (irregular surface), such as when the previously formed 3-D part layers do not have a smooth, planar surface. Thus, the methods and devices herein use acoustic waves to launch build and support material from the ITB to the previously formed 3-D part layers on the platen, and these methods and devices use control processes and material selections to ensure the production of a high-quality 3-D printed part.

Figure 1:
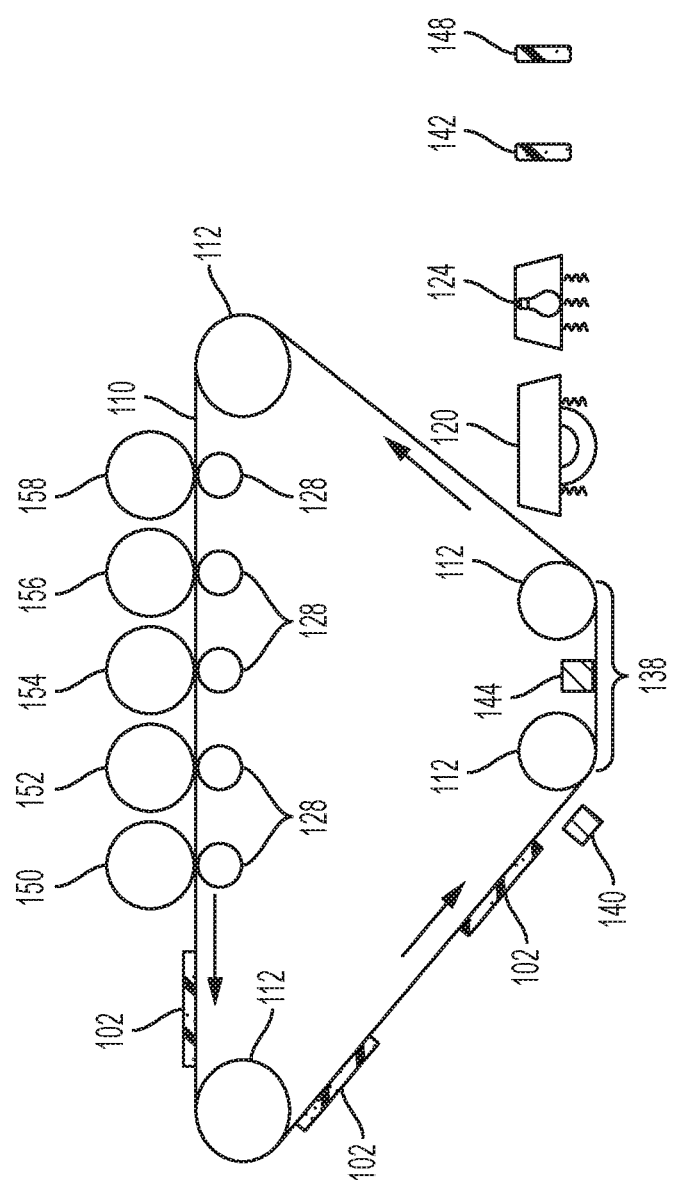
FIGS. 1-6 are schematic cross-section diagrams partially illustrating devices herein.

In order to address such issues, as shown, for example, in FIG. 1, exemplary three-dimensional (3-D) printers herein include, among other components, different color development stations 152-158 positioned to electrostatically transfer different colored curable (e.g., potentially ultraviolet (UV) light curable) build materials to an intermediate transfer belt (ITB 110); and at least one support material development station 150 positioned to electrostatically transfer support material to a location of the ITB 110 where the UV curable build materials are located on the ITB 110. For example, each different development station 150 can provide a color of build material that is different from the colors of the build materials supplied by other development stations 152-158. The color of the support material is not highly relevant because the support material dissolves in solvents (that do not affect the build materials) and is eventually removed from the final structure, as discussed below.

In addition, these printers include a transfer or transfuse station 138 having at least one roller 112 on one side of the ITB 110 supporting the ITB 110, and an acoustic transmission device 144 on the same side of the ITB 110 that aids transfer of the build and support materials to the platen 118. A charge neutralizer 140 is included on the opposite side of the intermediate transfer surface. The charge neutralizer 140 outputs an opposite charge to neutralize existing static charge on a layer 102 of the build material and the support material on the intermediate transfer surface 110, before the layer 102 reaches the transfer station 138.

The ITB 110 can be a flat, continuous belt supported on rotating rollers 112. A movable platen 118 (which can be a surface or belt) is adjacent the ITB 110. Also, such structures include a heater/pressure roller 120, and a curing station 124 that is positioned to apply light (e.g. UV light) using a light source. The structure can also include an optional support material removal station 148. A cooling station 142 is shown positioned adjacent the transfuse station 138.

As shown in FIG. 1, the color build material development devices 152-158 are positioned to electrostatically transfer (by way of charge difference between the belt and the material being transferred) build material, such as a (potentially dry) powder polymer-wax material (e.g., charged 3-D toner) to the ITB 110, and the support material development device 150 is positioned to also electrostatically transfer a different material (e.g., the support material, again such as a powder polymer-wax material (e.g., charged 3-D toner)) to a location of the ITB 110 where the build material is located on the ITB 110.

The support material dissolves in solvents that do not affect the build material to allow the printed 3-D structure formed of the build material to be separated from the support material used in the printing process. In the drawings, the combination of the build material and the support material is shown as element 102, and is sometimes referred to as a developed layer. The developed layer 102 of the build material and the support material is on a discrete area of the ITB 110 and is in a pattern corresponding to the components of the 3-D structure in that layer (and its associated support elements), where the 3-D structure is being built, developed layer 102 by developed layer 102.

As shown in FIGS. 2-6, the ITB 110 transfers a layer 102 made up of potentially different color UV curable build materials and the support material to the platen 118 each time the platen 118 contacts the other side of the ITB 110 at the transfuse station 138 (the side of the ITB 110 opposite the transfuse station roller(s) 112 and transmission device 144); and this successively forms multiple layers 102 of the UV curable build materials and the support material on the platen 118. Each of the layers 102 is formed by the development stations 150-158 on a discrete area of the ITB 110 and is formed in a pattern before transfer to the platen 118.

Figure 2:
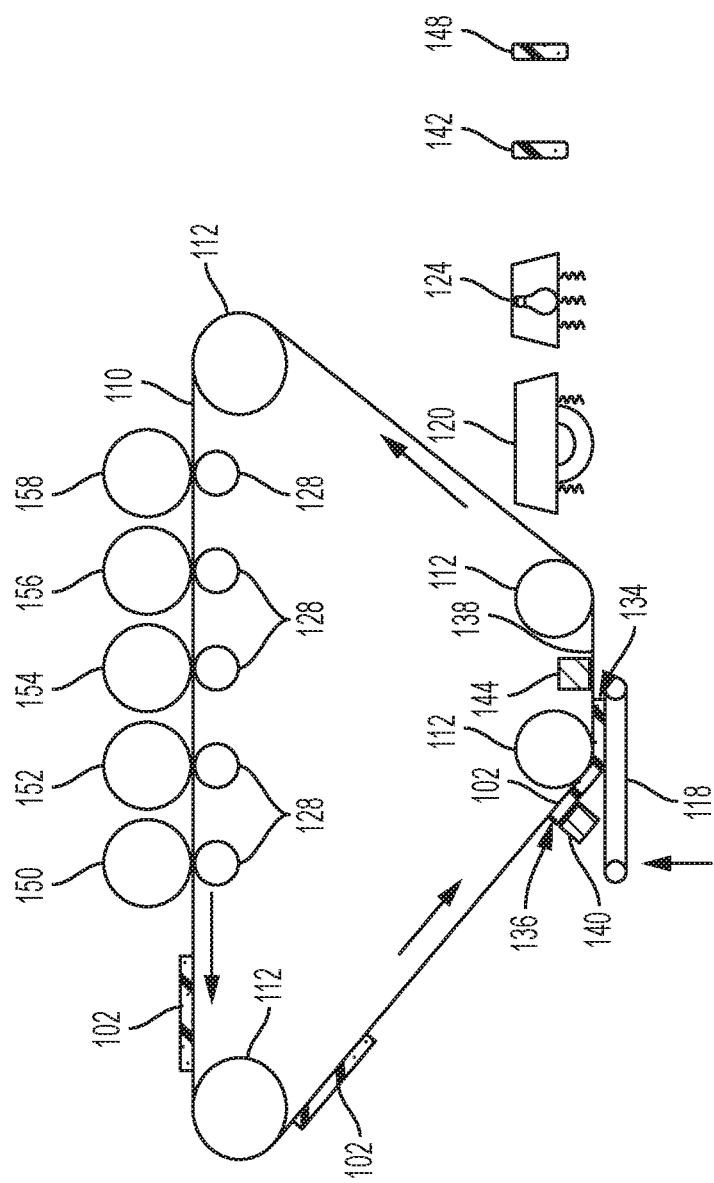

As shown by the vertical arrow in FIG. 2, the platen 118 moves (using motors, gears, pulleys, cables, guides, etc. (all generally illustrated by item 118)) toward the ITB 110 to have the platen 118 make contact with the ITB 110. The ITB 110 electrostatically transfers one of the developed layers 102 of the build material and the support material to the platen 118 each time the platen 118 contacts the ITB 110, to successively form developed layers 102 of the build material and the support material on the platen 118.

Such build and support material are printed in a pattern on the ITB by each separate development device 150-158, and combine together in the developed layers 102 to represent a specific pattern having a predetermined length. Thus, each of the developed layers 102 has a leading edge 134 oriented toward the processing direction in which the ITB 110 is moving (represented by arrows next to the ITB 110) and a trailing edge 136 opposite the leading edge 134.

More specifically, as shown in FIG. 2, at the transfuse station 138, the leading edge 134 of the developed layer 102 within the transfuse station 138 begins to be transferred to a corresponding location of the platen 118. Thus, the platen 118 moves to contact the developed layer 102 on the ITB 110 at a location where the leading edge 134 of the developed layer 102 is at the lowest location of the roller 112 of the transfuse station 138. Thus, in this example, the trailing edge 136 of the developed layer 102 has not yet reached the transfuse station 138 and has not, therefore, yet been transferred to the platen 118.

The process of developing the build and support materials in a pattern on the ITB by each separate development device 150-158 leaves an electrostatic charge in the layer 102. However, the existing electrostatic charge in the layer 102 can increase the attraction of the layer 102 toward the ITB 110, which in turn can increase the difficulty of transferring to layer 102 from the ITB 110 to the platen 118. In view of this, the methods and devices herein remove or neutralize the existing electrostatic charge from the layer 102 before the layer 102 reaches the transfuse station 138.

In order to remove this existing electrostatic charge in the layer 102, the charge neutralizer 140 outputs an opposite charge (e.g., outputs a charge opposite to the electrostatic charge; or, in other words, a charge matching the existing electrostatic charge, but opposite in polarity, to the existing electrostatic charge of the layer 102) to neutralize existing electrostatic charge on a layer 102 of the build material and the support material on the intermediate transfer surface 110, before the layer 102 reaches the transfer station 138. The charge generator 140 can be any type of charge generating device, such as a corona charge device generating charges and projecting (spraying) the charges. With the layer 102 having little or no electrostatic charge, the acoustic energy output by the acoustic transmission device 144 is more effective in driving the layer 102 off the ITB 110 and onto the platen 118.

Figure 3:
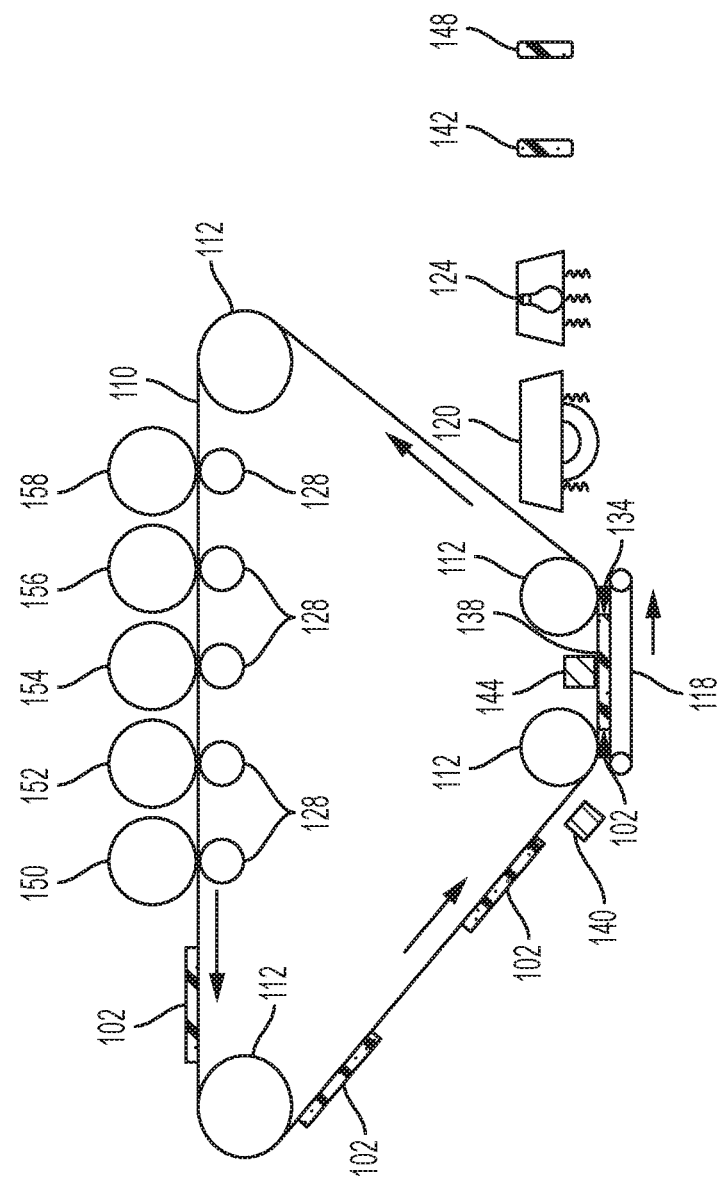

As shown in FIG. 3, the platen 118 can move synchronously with the ITB 110 (moves at the same speed and the same direction as the ITB 110) either by moving or rotating the platen vacuum belt, to allow the developed layers 102 to transfer cleanly to the platen 118, without smearing. In other alternatives, rather than contacting the ITB 110 as the layer 102 approaches in the transfuse station 138 as shown in FIG. 2, instead processing can move the platen 118 into the position shown in FIG. 3 when first making contact between the platen 118 and the layer of developed material 102 on the ITB 110. In either situation, the acoustic energy output by the acoustic transmission device 144 drives the layer 102 off the ITB 110 and onto the platen 118, without using electrostatic charges and without adding heat to the layers 102 on the ITB 110.

Figure 4:
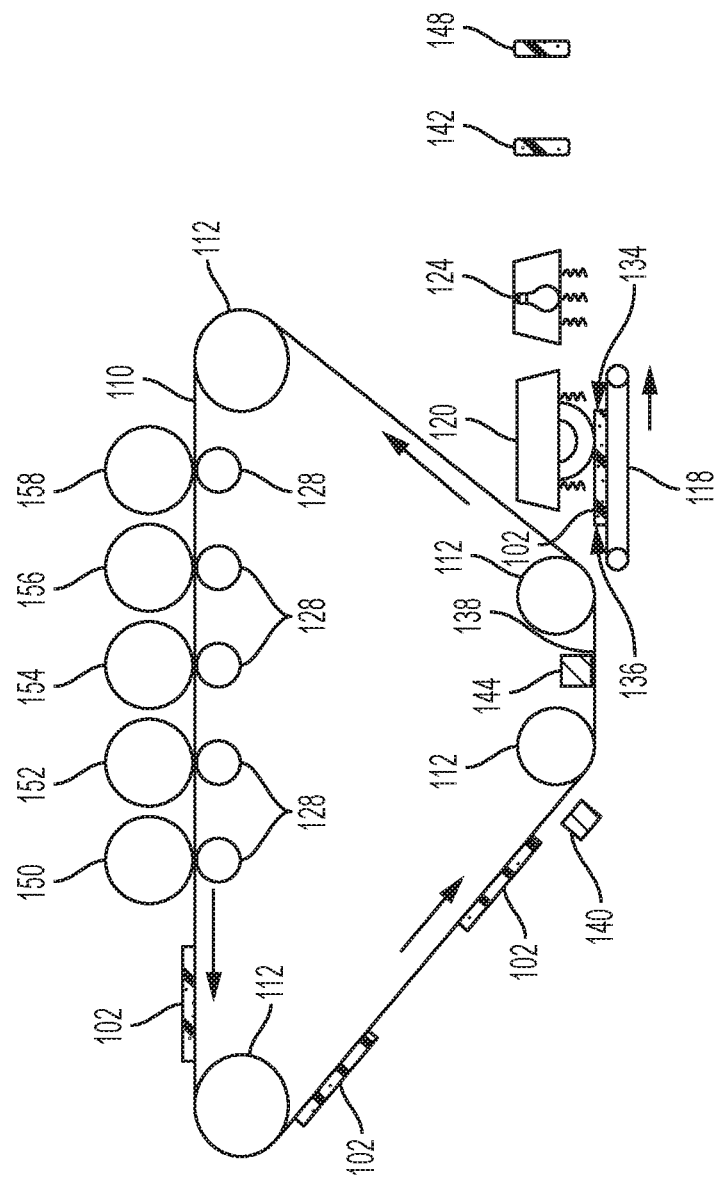

Then, as the ITB 110 moves in the processing direction, the platen 118 moves at the same speed and in the same direction as the ITB 110, until the trailing edge 136 of the developed layer 102 reaches the end of the transfuse station 138, at which point the platen 118 moves away from the ITB 110 and over to the heater/pressure roller 120, as shown in FIG. 4. While shown as including a roller, the heater/pressure roller 120 can be a non-contact device (e.g., resistive heater, infrared (IR) heater, etc.) which lightly bonds the layer 102 to the platen). As shown in FIG. 4, the platen 118 moves to the heater/pressure roller 120 and moves synchronously as the pressure roller 120 rotates, potentially heating and pressing the developed layer 102 to lightly bond the developed layer 102 to the platen 118 (or to any previously transferred layers 102 existing on the platen 118). This synchronous movement between the platen 118 and the ITB 110 (and pressure roller 120) causes the pattern of support and build materials (102) that is printed by the development devices 150-158 to be transferred precisely from the ITB 110 to the platen 118, without distortion or smearing.

Figure 5:
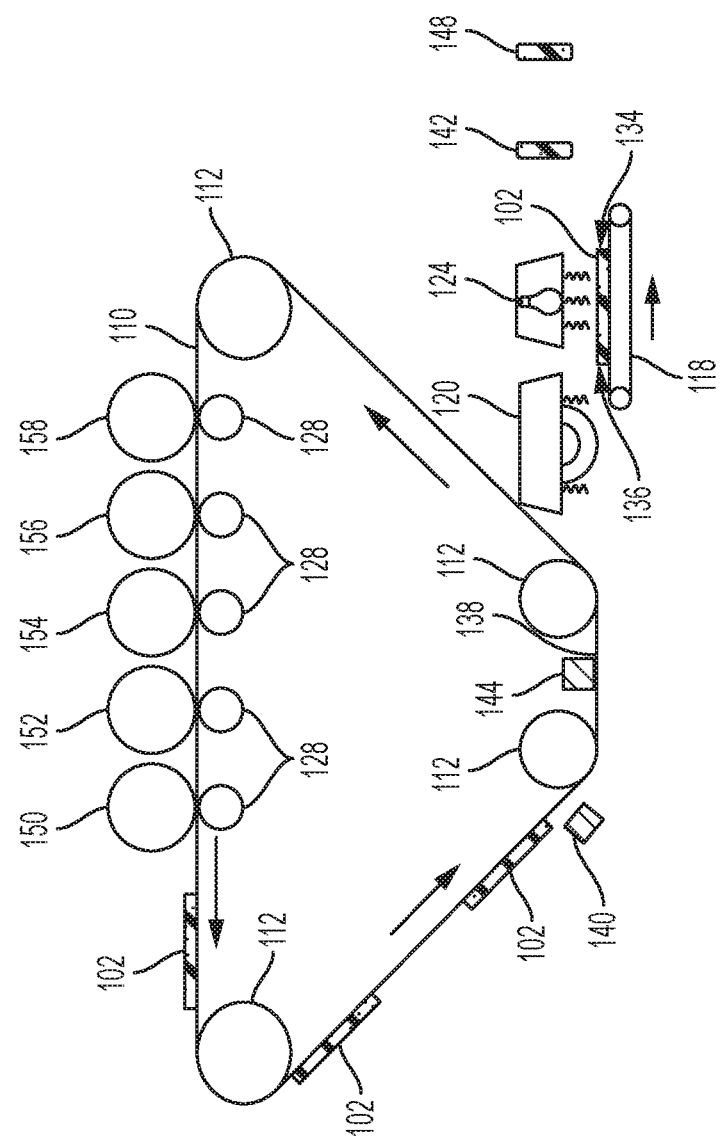

As shown in FIG. 5, the platen 118 moves to the curing station 124 that is configured to apply light and/or heat to the 3-D structure to cure the developed layers 102 into the freestanding stack 106 on the platen 118. The selective use of heaters, lights, and other components of the curing station 124 will vary depending upon the chemical makeup of the developed layers 102.

In one example, the build material 104 can be UV curable toners. Curing station 124 cures such materials by heating the materials to a temperature between their glass transition temperature and their melting temperature, and applying UV light to cross-link polymers within at least the build materials (and possibly within the support materials also) thereby creating a rigid structure. Those ordinarily skilled in the art would understand that other build and support materials could utilize other bonding processing and bonding components, and that the foregoing is presented only as one limited example; and the devices and methods herein are applicable to all such bonding methods and components, whether currently known or developed in the future.

Figure 6:
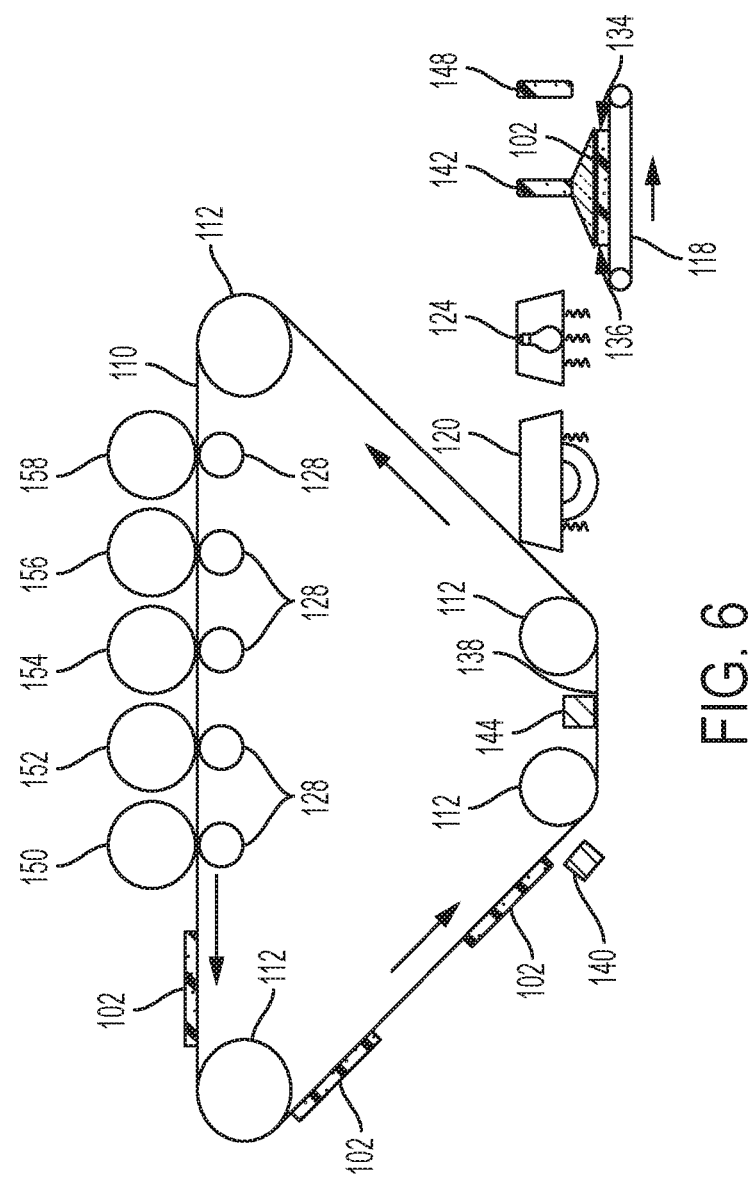

In FIG. 6, the cooling station 142 (which can comprise a fan, ductwork, air conditioner compressor, etc.) blows potentially cooled air (and/or potentially vents hot air away) to dissipate the heat imparted by the heater/pressure roller 120. However, the amount of cooling performed by the cooling station 142 can be limited (or in some structures the cooling station 142 can be omitted) in order to allow the layer(s) 102 on the platen 118 to remain at an elevated temperature (e.g., near their glass transition temperature) so that the layer(s) 102 on the platen 118 remain tacky, which promotes transfer of additional layers 102 as the platen 118 returns to the transfuse station 138.

The platen 118 can move to the heater/pressure roller 120, and/or cooling station 142 after each time the ITB 110 transfers each of the developed layers 102 to the platen 118 to independently heat and press each of the developed layers 102 and successively join each the developed layer 102 to the platen 118 and to any previously transferred developed layers 102 on the platen 118. In other alternatives, the platen 118 may only move to the heater/pressure roller 120 after a specific number (e.g., 2, 3, 4, etc.) of the developed layers 102 have been placed on the platen 118 to allow multiple developed layers 102 to be simultaneously bonded to the platen 118 and to each other by the heater/pressure roller 120.

Figure 7:
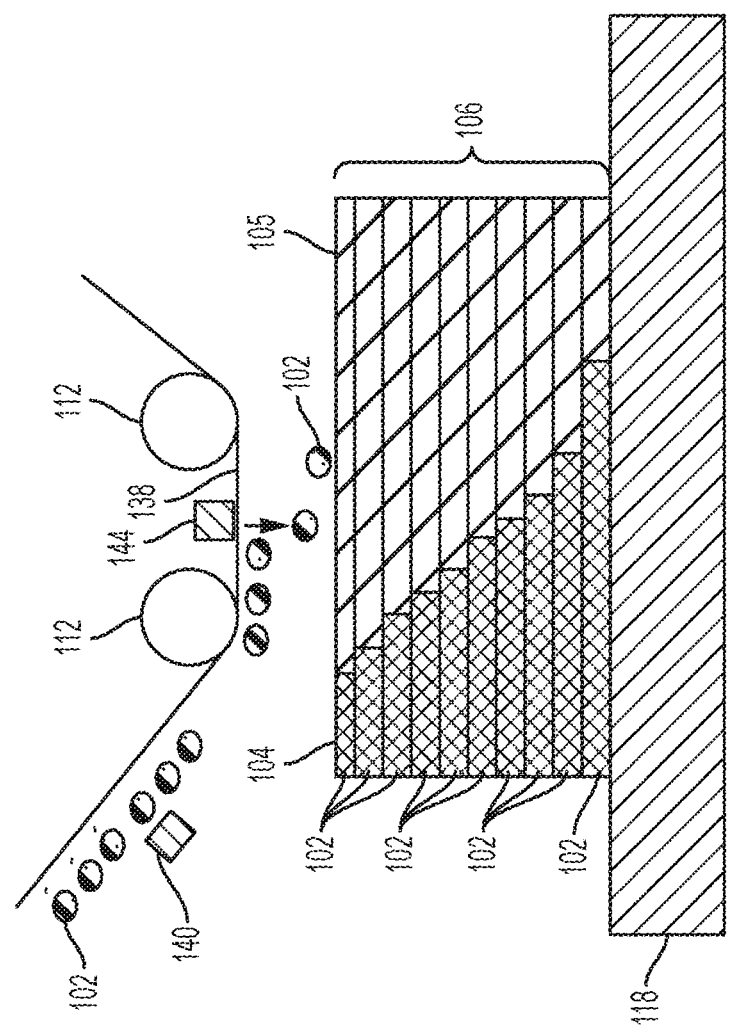
FIG. 7 is an expanded schematic diagram illustrating devices herein.

Thus, the processing in FIGS. 2-6 is repeated to fuse or bond multiple developed layers 102 to the platen 118 (and to one another), as shown in FIG. 7. FIG. 7 is an expanded diagram showing how the developed layers 102 may contain some of the build material 104 and some of the support material 105, and how the lowest developed layer 102 is joined to the platen 118, and how each successive developed layer 102 contacts and is joined to the immediately preceding adjacent developed layer 102 that is below (e.g., is between the layer 102 and the platen 118) to form a stack 106 of developed layers 102 on the platen 118.

As noted above, the particles of build materials 104 and support material 105 within each developed layer 102 (shown as particles (not drawn to scale) in FIG. 7, using identification number 102) are charged particles, and FIG. 7 shows these items as negatively charged particles (primarily negative, they could be slightly positively charged in some unusual cases). As is understood by those ordinarily skilled in the art, the printing components 150-158 provide the charge to the particles 102 in order to have such particles electrostatically transfer to the ITB 110.

The height of the stack 106 will make the distance between the build and support particles 102 greater than the ability of the electrostatic charges to attract the particles 102 (and this height will vary, depending upon the strength of the various charges) when performing electrostatic transfer at the transfuse station. Therefore, instead of performing electrostatic transfer at the transfuse station, the transmission device 144 is used to acoustically drive the particles 102 using acoustic waves. In other words, the transmission device 144 physically vibrates the layers 102 off the ITB 110 and on to the existing stack 106 on the platen 118. Further, as can be seen in FIG. 7, the particles have charge (a negative charge in this example), but lose that charge as they pass by the neutralization station 140. Additionally, the methods and devices herein avoid heating the ITB 110 (or the layers 102 thereon) in order to allow the layers 102 to remain as unmelted/unfused powder-like materials (with all static charge removed by charge neutralizer 140), and these actions allow the acoustic energy output from the acoustic transmission device 144 to be highly effective in transferring the layers 102 to the platen 118.

For example, the transmission device 144 can be any form of resonator, speaker, vibrator, etc., that is suitable for generating vibratory energy, as such is arranged in line with (and may contact) the back side of the ITB 110 surface for uniformly applying vibratory energy to the ITB 110 such that the layer 102 will be released from the forces adhering it to the ITB 110 at the transfuse station 138. Thus, the layers 102 are transferred across the transfuse station 138 gap by the vibratory energy output from the transmission device 144.

Figure 8:
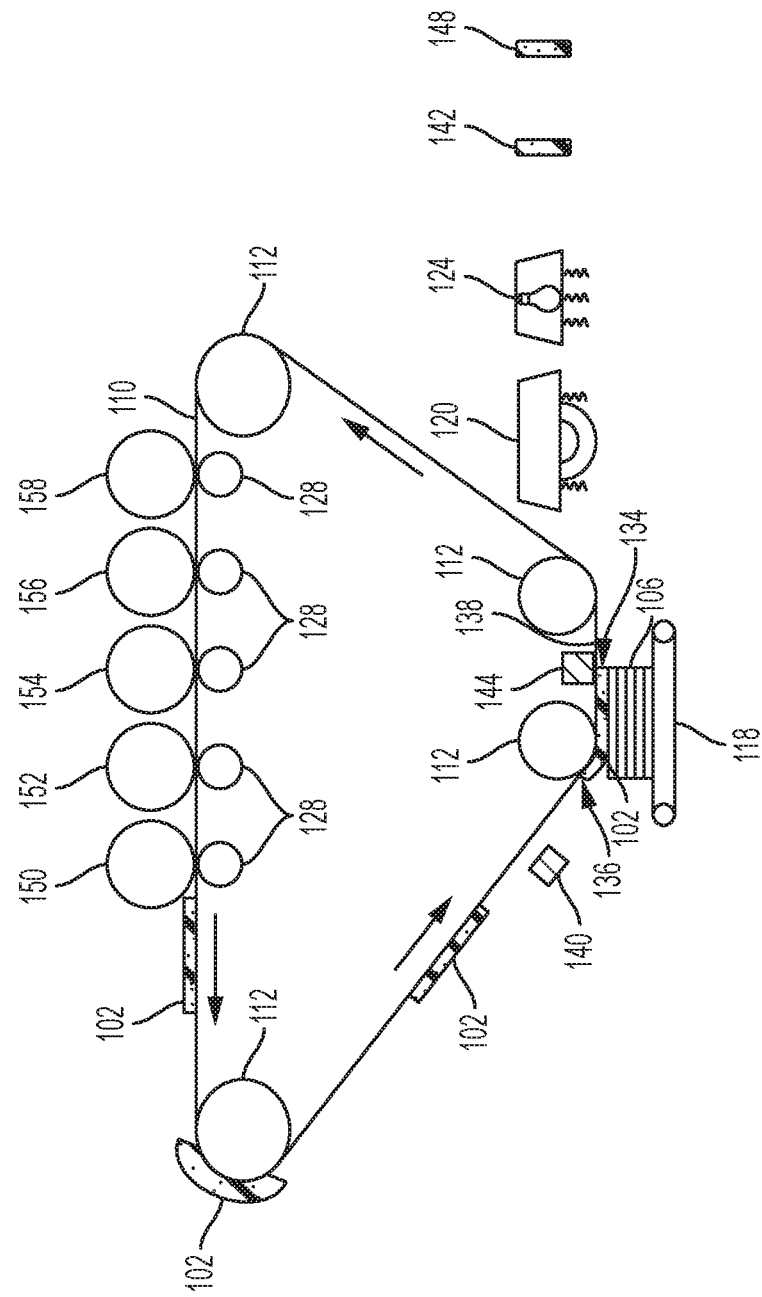
FIGS. 8-24 are schematic cross-section diagrams partially illustrating devices herein.
Figure 9:
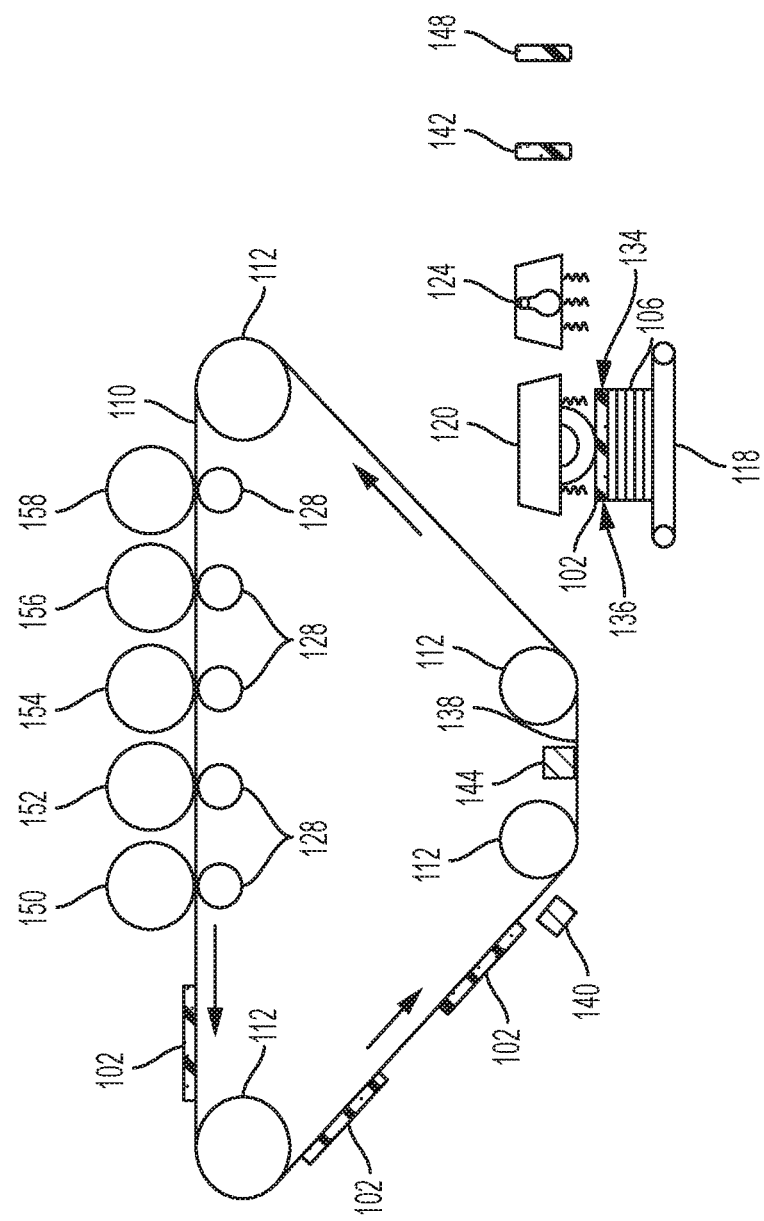
Figure 10:
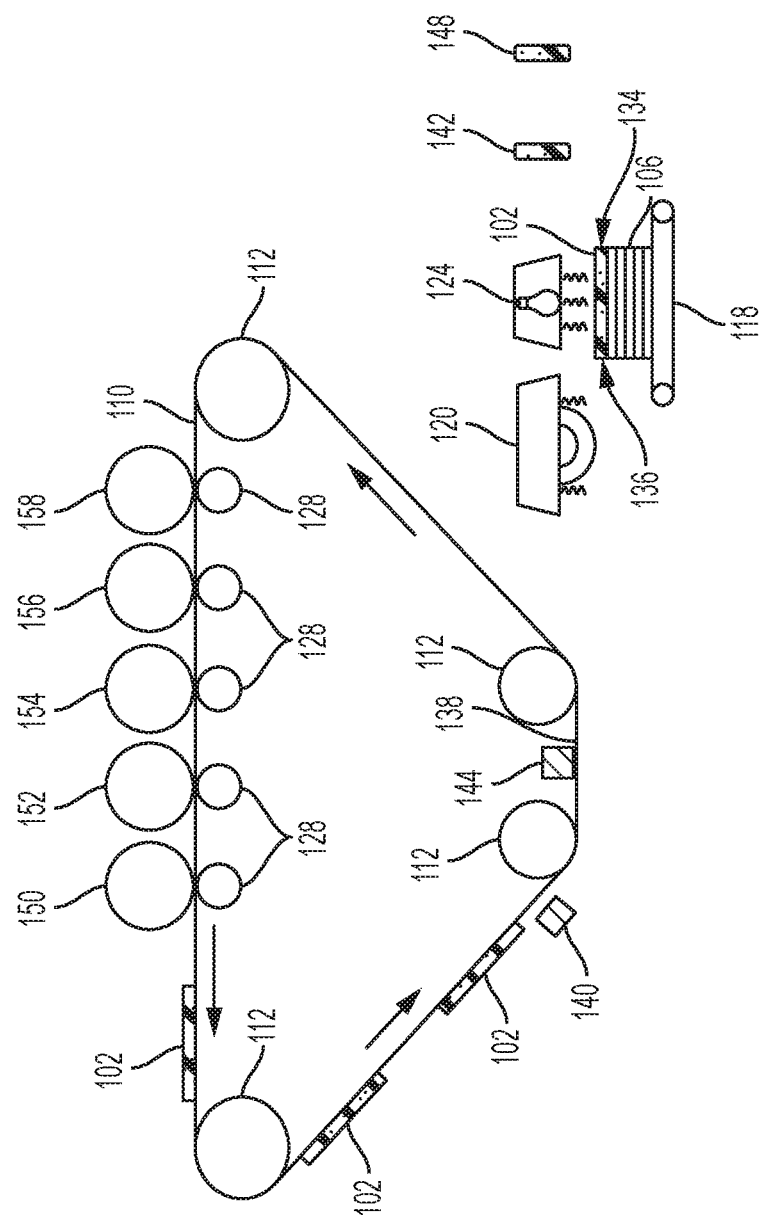
Figure 11:
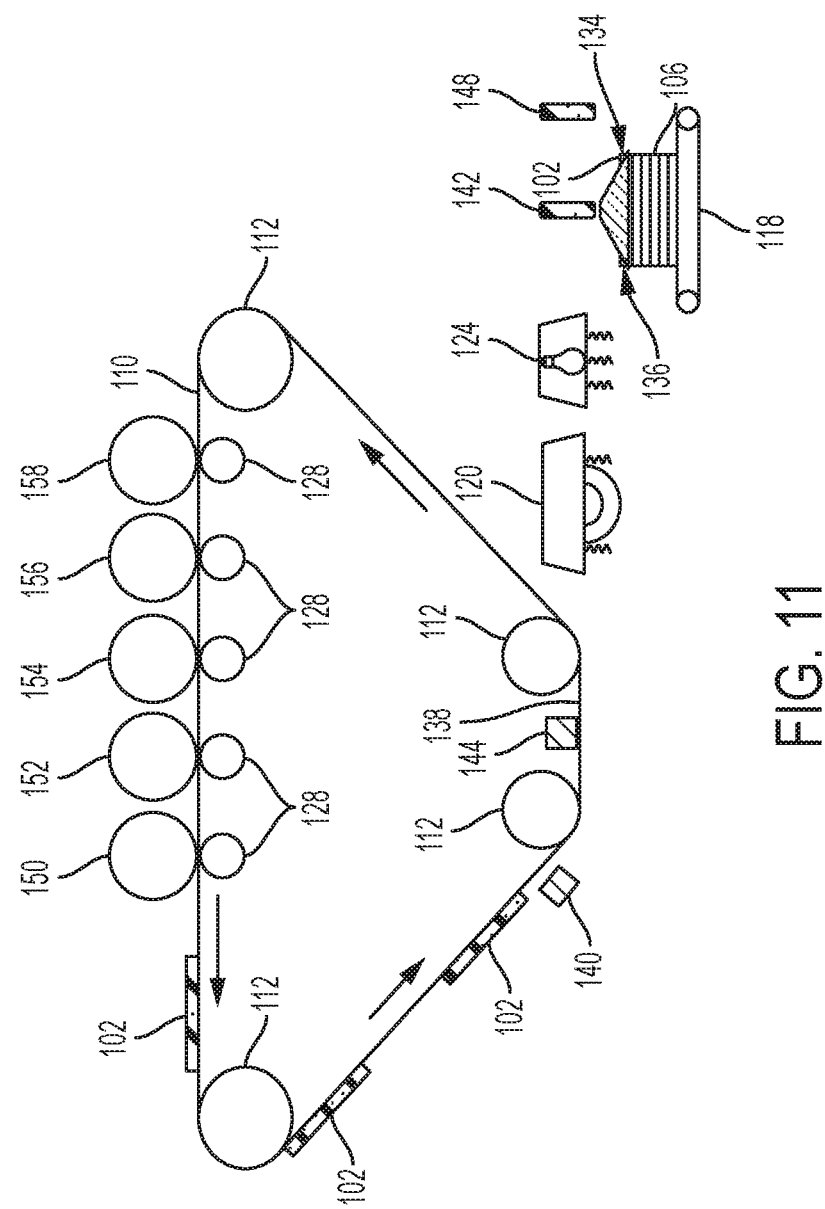

As the stack 106 of the developed layers 102 grows, additional developed layers 102 are formed on top of the stack 106, as shown in FIG. 8, and such additional developed layers 102 are heated and/or pressed by the heater/pressure roller 120, as shown in FIG. 9, cured as shown in FIG. 10 (to bond/fuse all the develop layers 102 within the stack 106 together), and cooled by the cooling station 142 as shown in FIG. 11. As noted above, the curing station 124 can apply light and/or heat after each time the ITB 110 transfers a layer 102 to the platen 118, to independently cure each layer 102 or the layers 102 can be cured in groups, or the curing station 124 may not be utilized until the entire freestanding stack 106 is completely formed.

Figure 12:
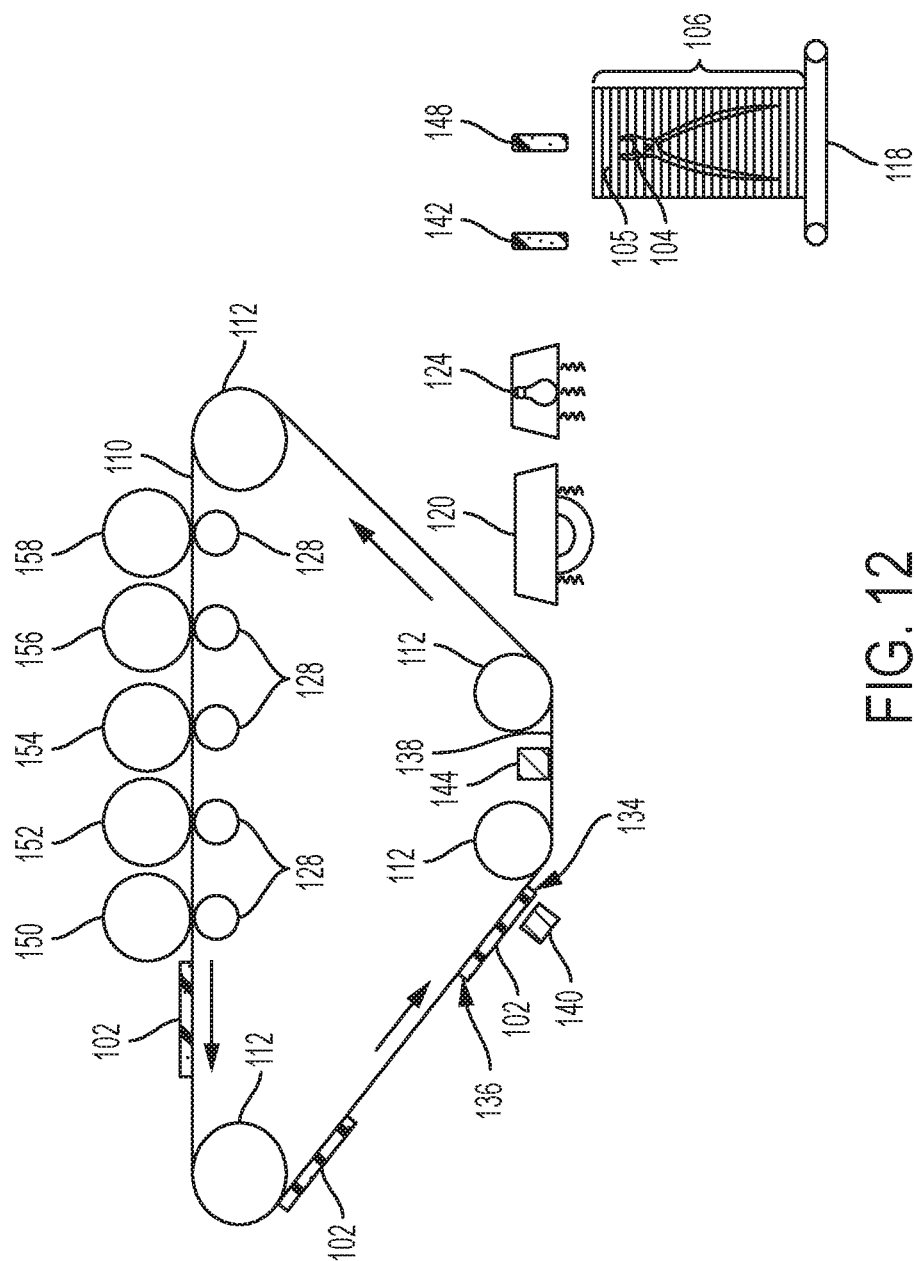

In FIG. 12 an overlay is illustrated showing portions of support material 105 and build material 104 within the fully formed freestanding stack 106. Such may or may not be visible, and is only illustrated to show one exemplary way in which such build and support materials may be arranged. The 3-D structure in the freestanding stack 106 can be output to allow manual removal of the support material 105 using an external solvent bath; or processing can proceed as shown in FIG. 13-17.

Figure 13:
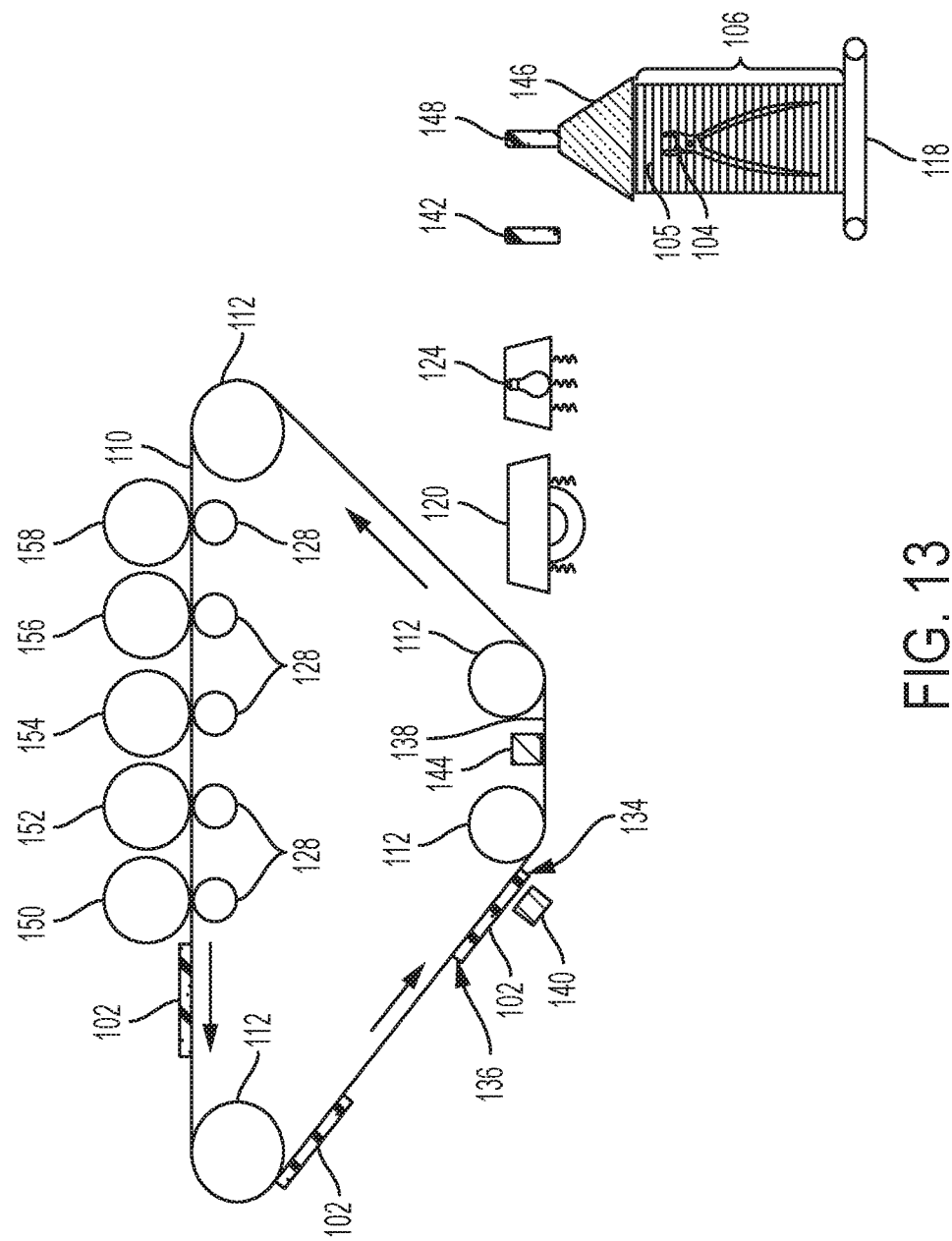
Figure 14:
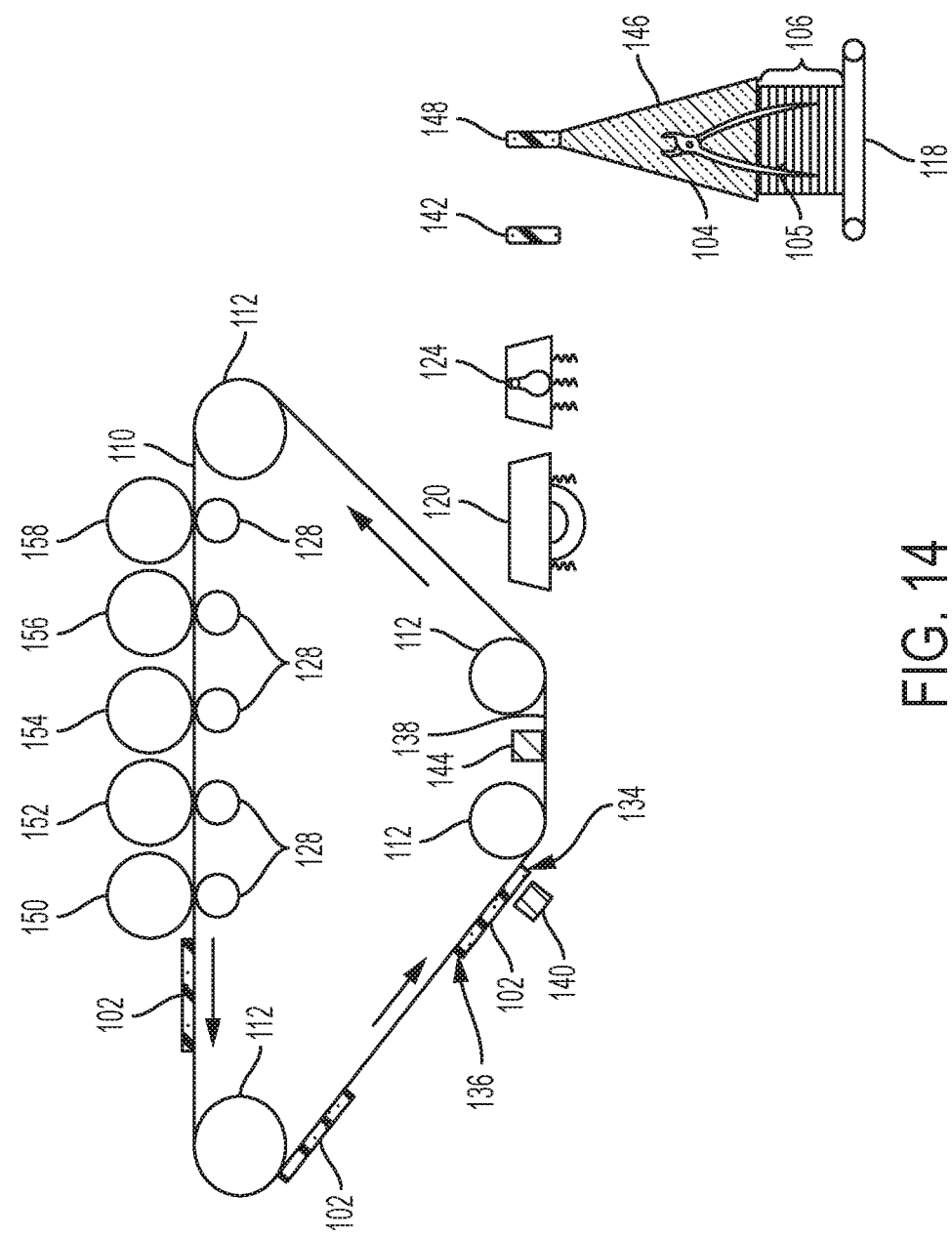
Figure 15:
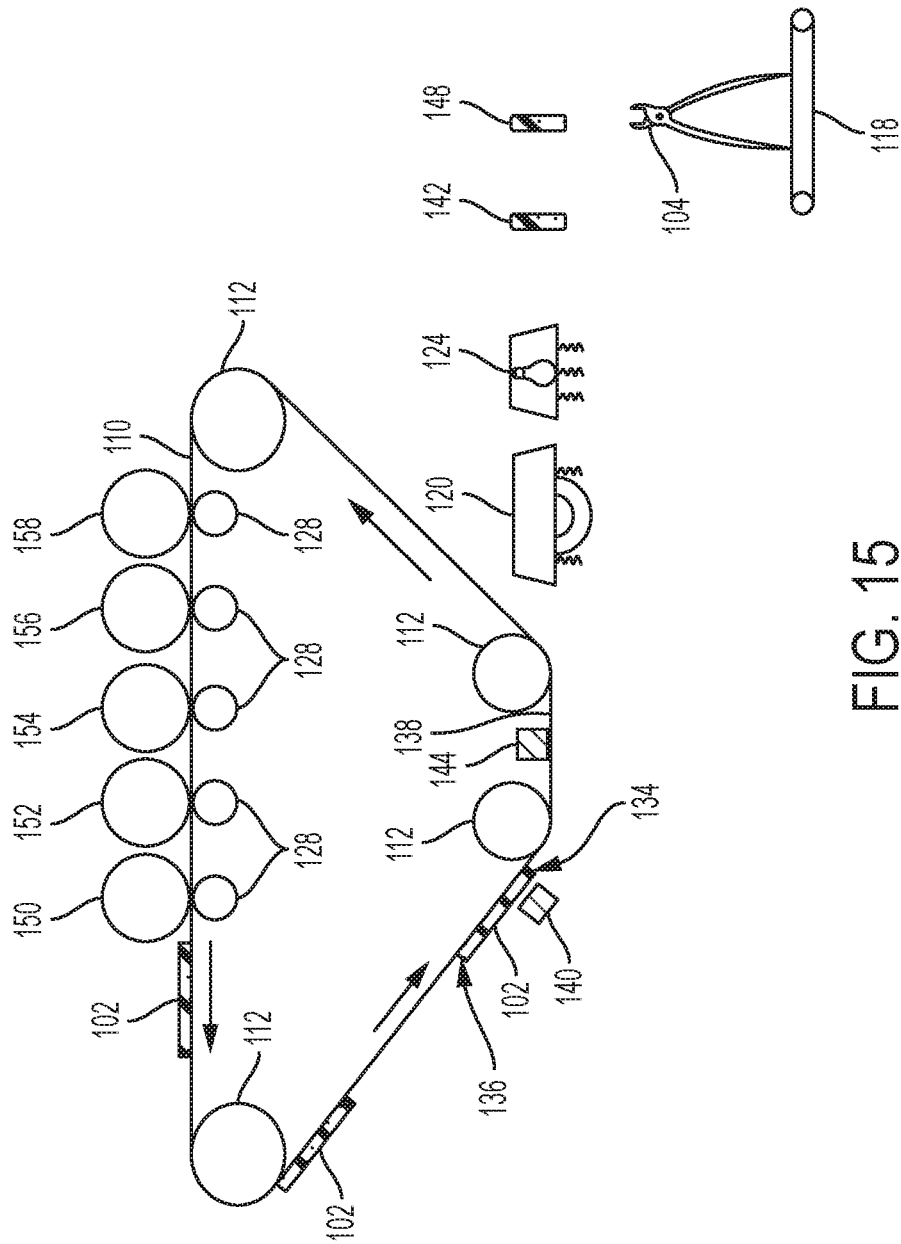
Figure 16:
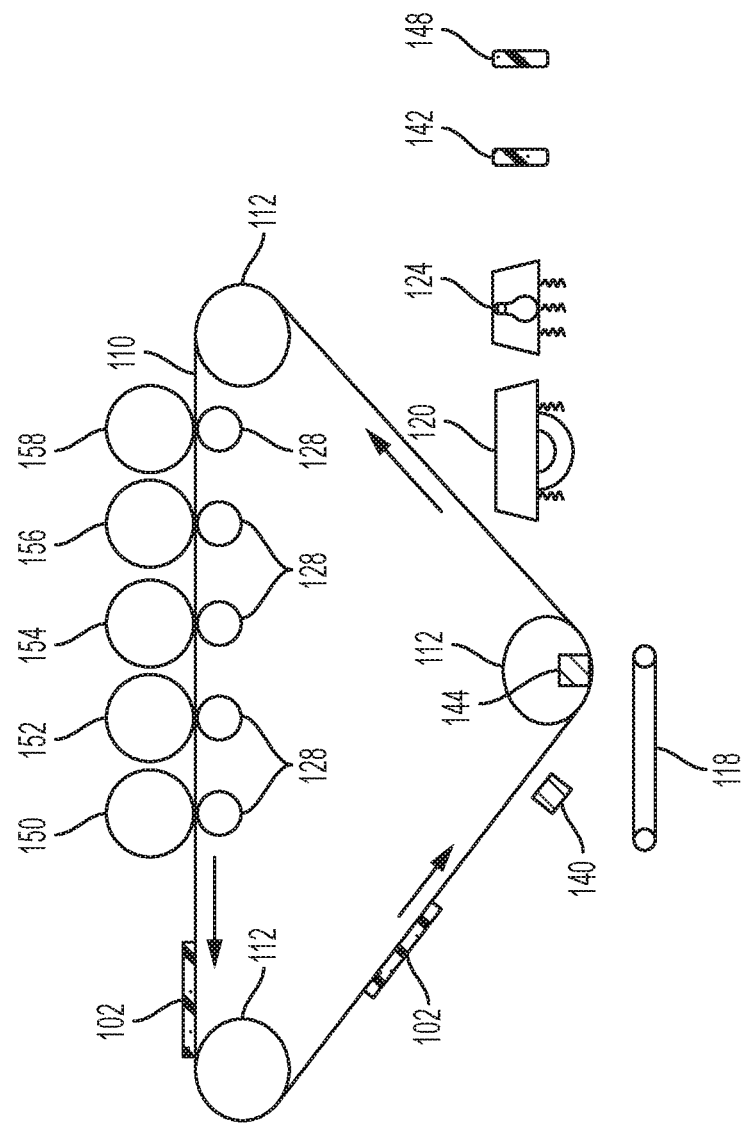
Figure 17:
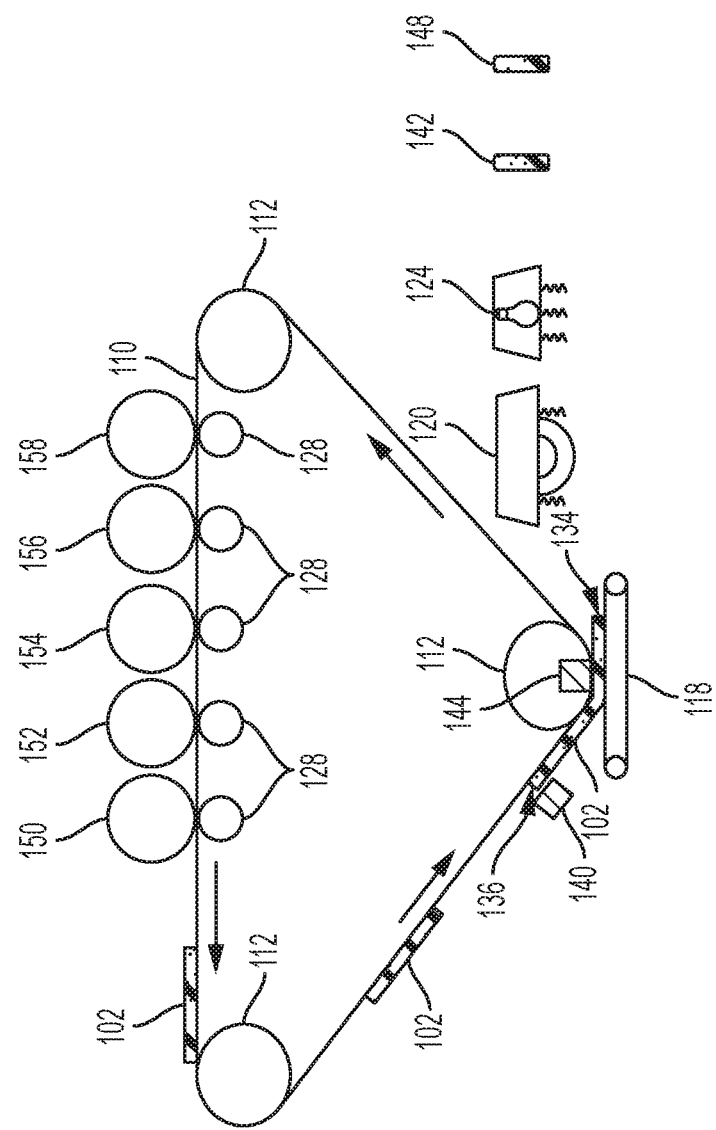
Figure 18:
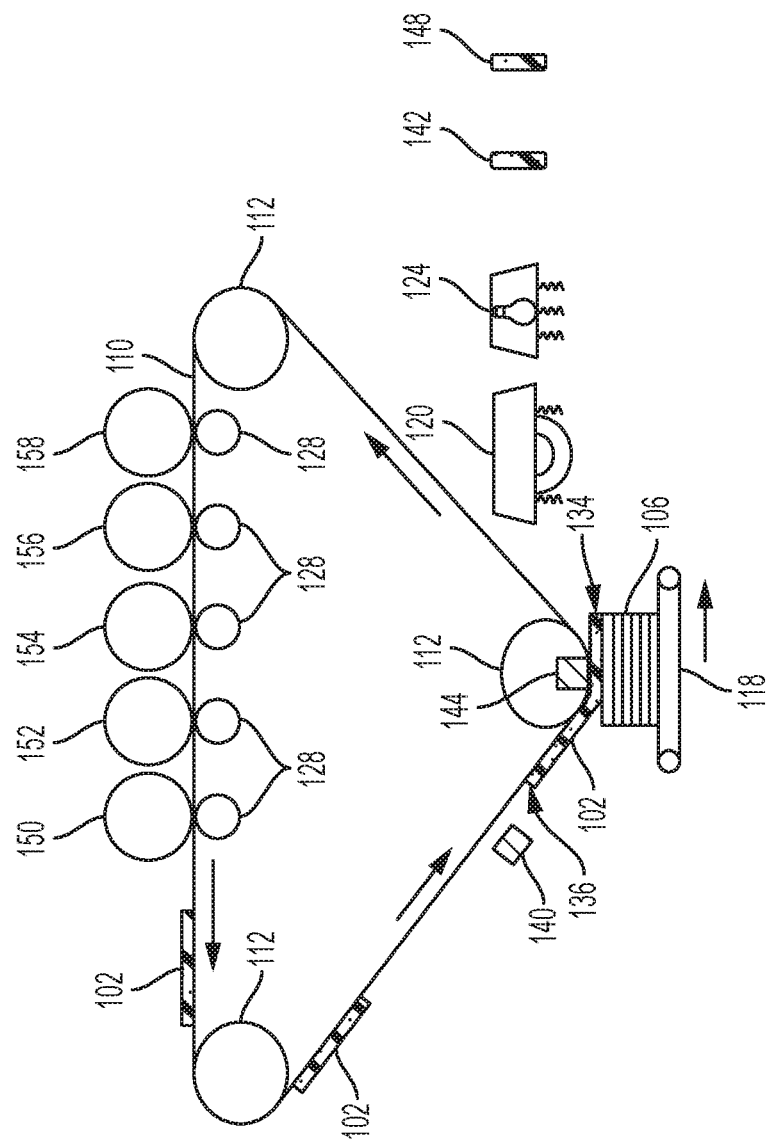
Figure 19:
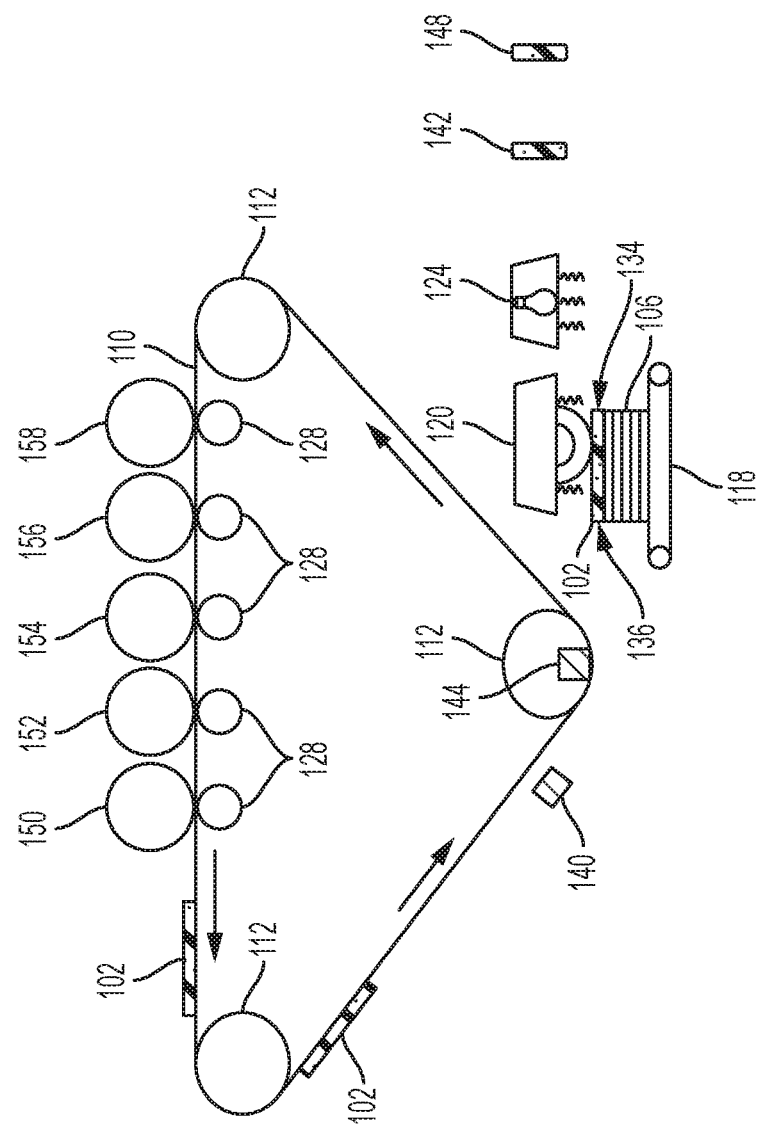
Figure 20:
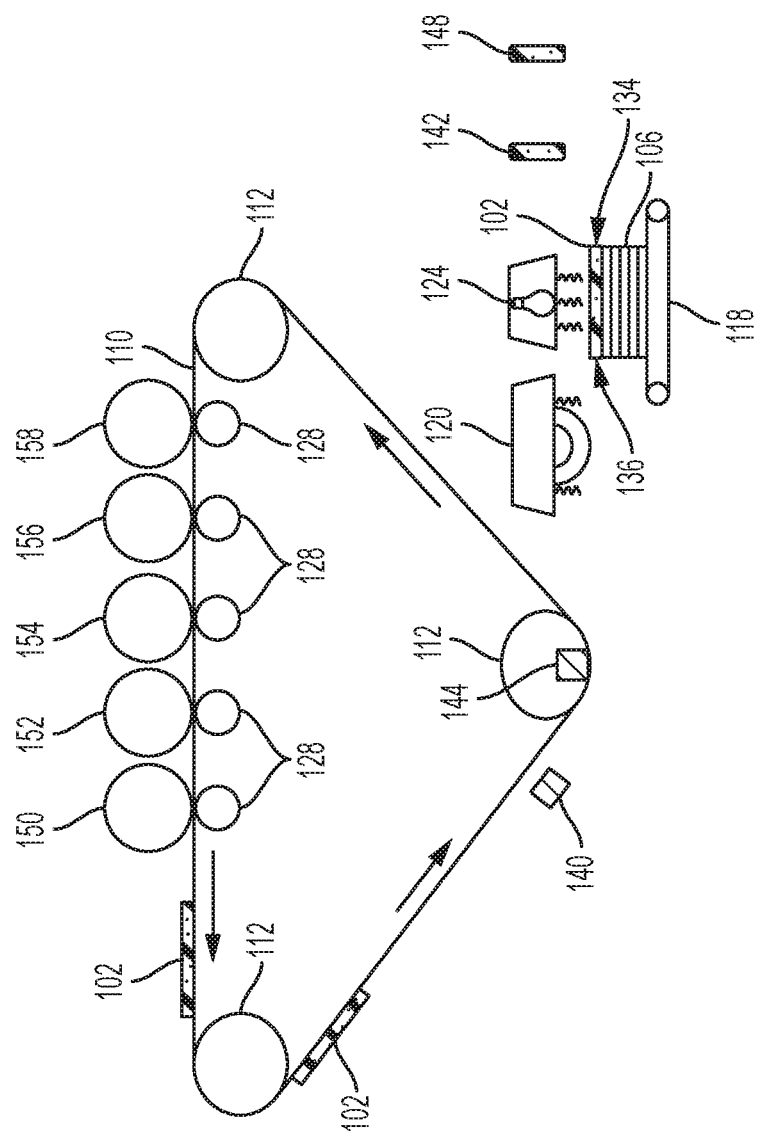

More specifically, in FIG. 13, the support material removal station 148 is positioned to receive the now bonded 3-D structure (freestanding stack 106) on the platen 118. The support material removal station 148 applies a solvent 146 that dissolves the support material 105 without affecting the build material 104. Again, as noted above, the solvent utilized will depend upon the chemical makeup of the build material 104 and the support material 105. FIG. 14 illustrates the processing where about half of the support material 105 remains, and a portion of the build material 104 protrudes from the remaining stack of support material 105. FIG. 15 illustrates processing after the support material removal station 148 has applied sufficient solvent 146 to dissolve all the support material 105, leaving only the build material 104 remaining, which leave a completed 3-D structure made of only the build material 104.

FIGS. 16-21 illustrate an alternative 3-D electrostatic printing structure herein which includes a transfuse nip 130 in place of the planar transfuse station 138 shown in FIGS. 1-16. As shown in FIG. 1, the planar transfuse station 138 is a planar portion of the ITB 110 that is between rollers 112 and is parallel to the platen 118; while in FIG. 16, the transfuse nip 130 presents a single point of transfer.

Figure 21:
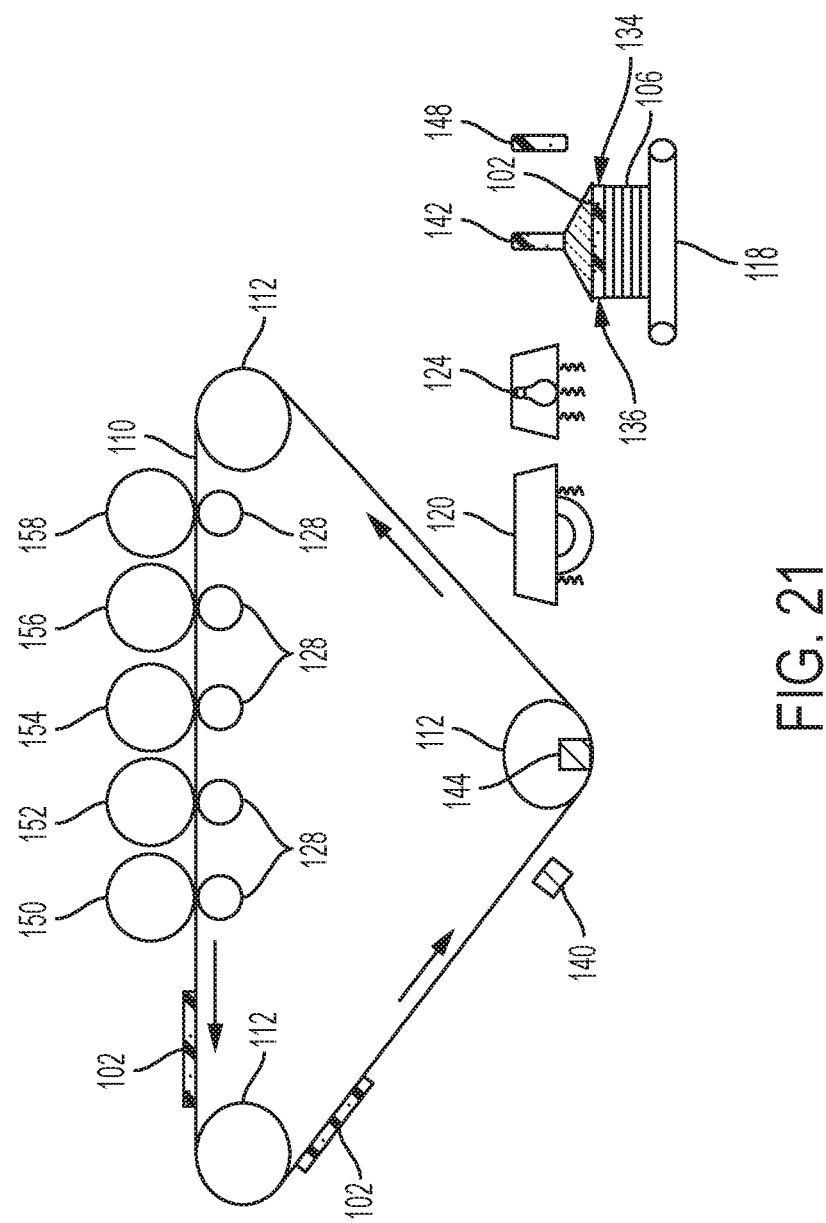

In similar operations to that discussed above, as shown in FIG. 17 the platen 118 moves synchronously with the ITB 110 to have each layer 102 transfer onto the platen 118 cleanly and without smearing, and such processing is repeated to eventually form a stack 106 of the layers 102. After transferring each successive layer 102 to the platen 118 (FIG. 18), each layer 102 (or groups of layers 102 in a stack 106) are heated and pressed by the heater/pressure roller 120, cured by the curing station 124 in FIG. 20, and cooled by the cooling station 142, as shown in FIG. 21. Additionally, all other processing mentioned above can be performed using the structure shown in FIGS. 16-21.

Figure 22:
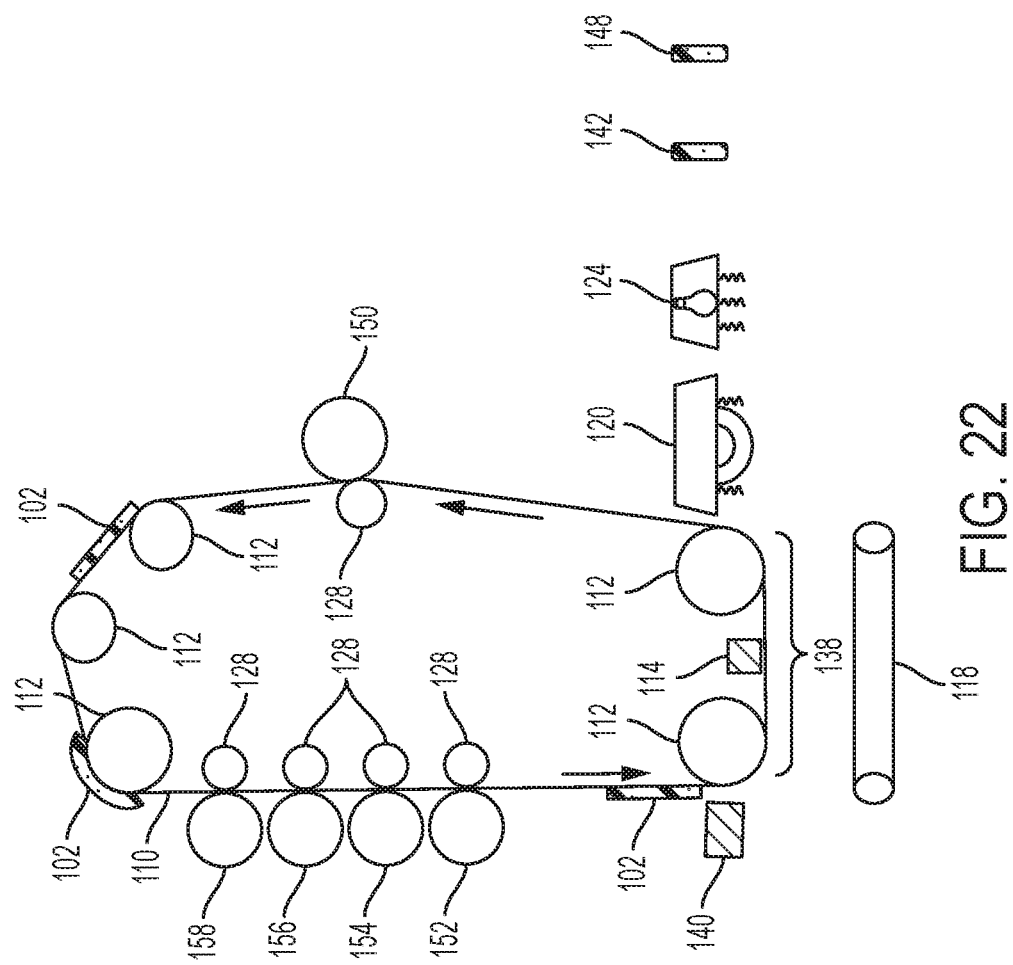
Figure 23:
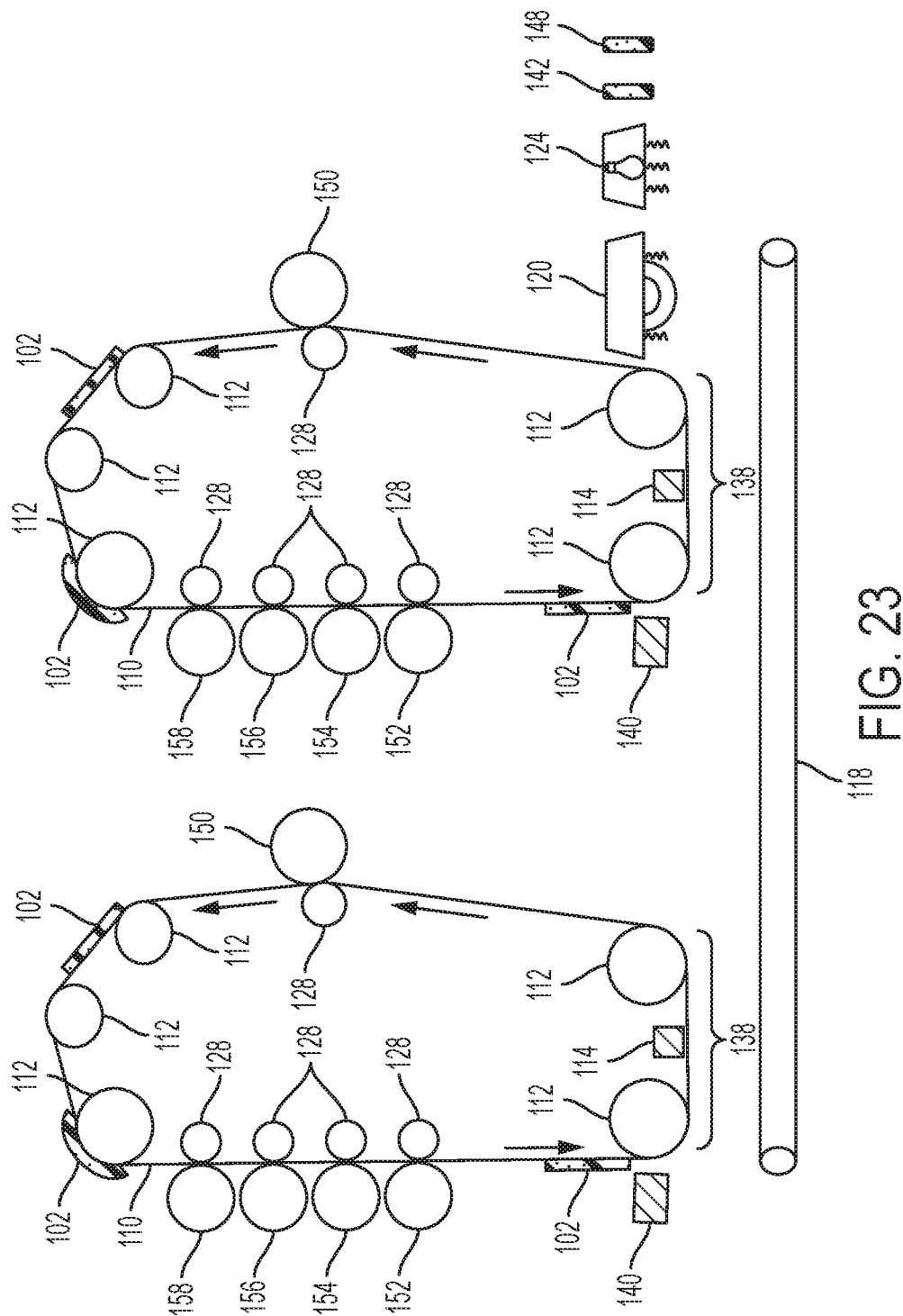

FIGS. 22 and 23 illustrate alternative structures used by methods and devices herein. More specifically, FIG. 22 illustrates the components that are discussed above in a more vertical arrangement that is more space compact. FIG. 23 illustrates multiple ITBs 110, each having a full complement of association components (development devices, transfuse station, etc.) that are arranged so that they can be utilized to transfer layers to one or more platens 118 (one of which is illustrated in FIG. 23).

Figure 24:
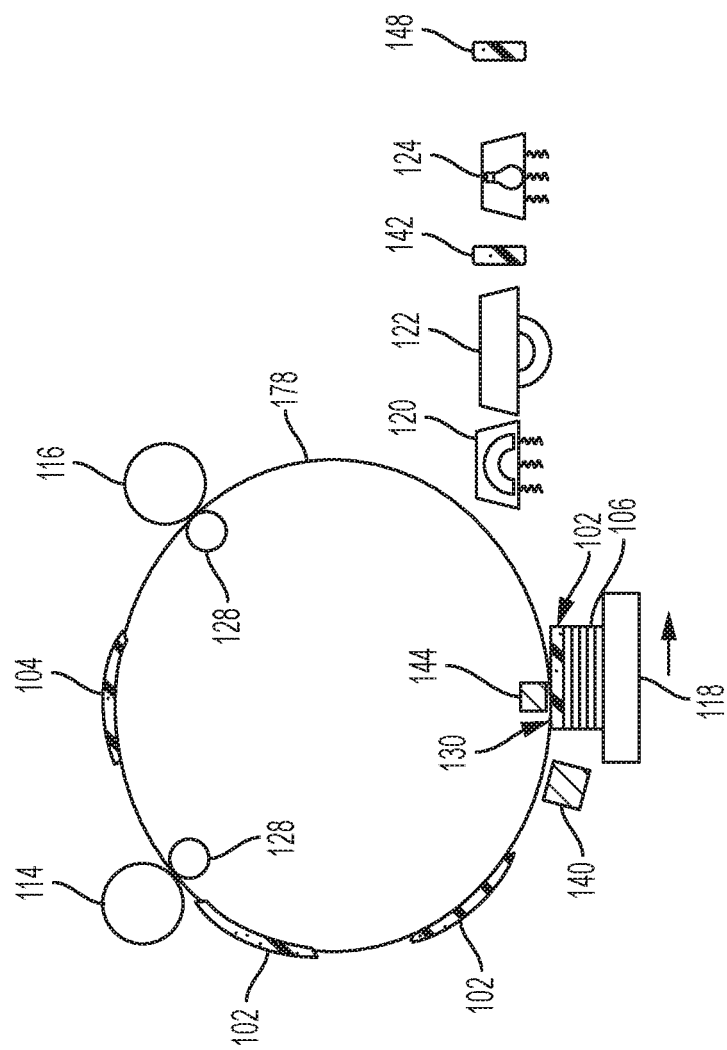

Alternatively, as shown in FIG. 24, a drum 178 could be used in place of the ITB 110, with all other components operating as described herein. Thus, the drum 178 could be an intermediate transfer surface receiving material from development stations 114, 116, as described above, or could be a photoreceptor and operate as the photoreceptor 256 described below operates, by maintaining a latent image of charge and receiving materials from development devices 254.

Figure 25:
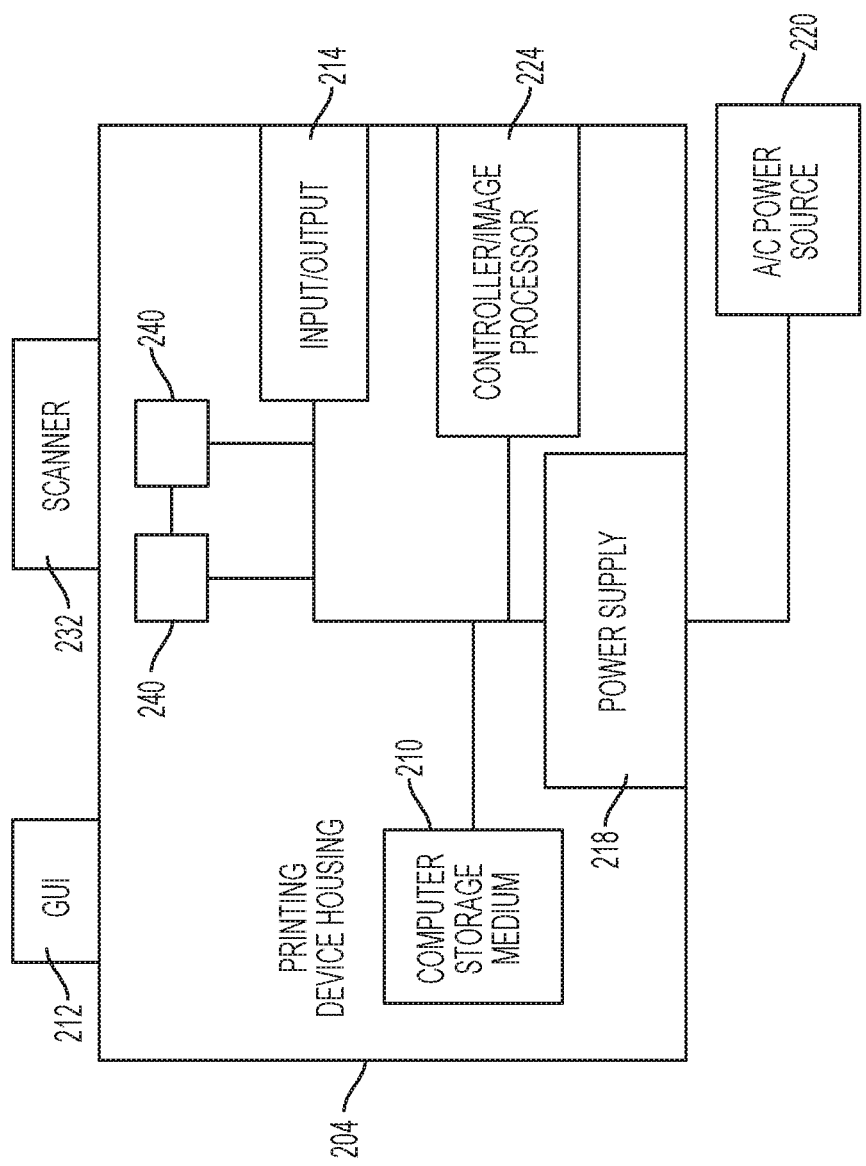
FIG. 25 is a schematic cross-section diagram partially illustrating printing devices herein.

FIG. 25 illustrates many components of 3-D printer structures 204 herein. The 3-D printing device 204 includes a controller/tangible processor 224 and a communications port (input/output) 214 operatively connected to the tangible processor 224 and to a computerized network external to the printing device 204. Also, the printing device 204 can include at least one accessory functional component, such as a graphical user interface (GUI) assembly 212. The user may receive messages, instructions, and menu options from, and enter instructions through, the graphical user interface or control panel 212.

The input/output device 214 is used for communications to and from the 3-D printing device 204 and comprises a wired device or wireless device (of any form, whether currently known or developed in the future). The tangible processor 224 controls the various actions of the printing device 204. A non-transitory, tangible, computer storage medium device 210 (which can be optical, magnetic, capacitor based, etc., and is different from a transitory signal) is readable by the tangible processor 224 and stores instructions that the tangible processor 224 executes to allow the computerized device to perform its various functions, such as those described herein. Thus, as shown in FIG. 25, a body housing has one or more functional components that operate on power supplied from an alternating current (AC) source 220 by the power supply 218. The power supply 218 can comprise a common power conversion unit, power storage element (e.g., a battery, etc), etc.

The 3-D printing device 204 includes at least one marking device (printing engine(s)) 240 that deposits successive layers of build and support material on a platen as described above, and are operatively connected to a specialized image processor 224 (that is different than a general purpose computer because it is specialized for processing image data). Also, the printing device 204 can include at least one accessory functional component (such as a scanner 232) that also operates on the power supplied from the external power source 220 (through the power supply 218).

Figure 26:
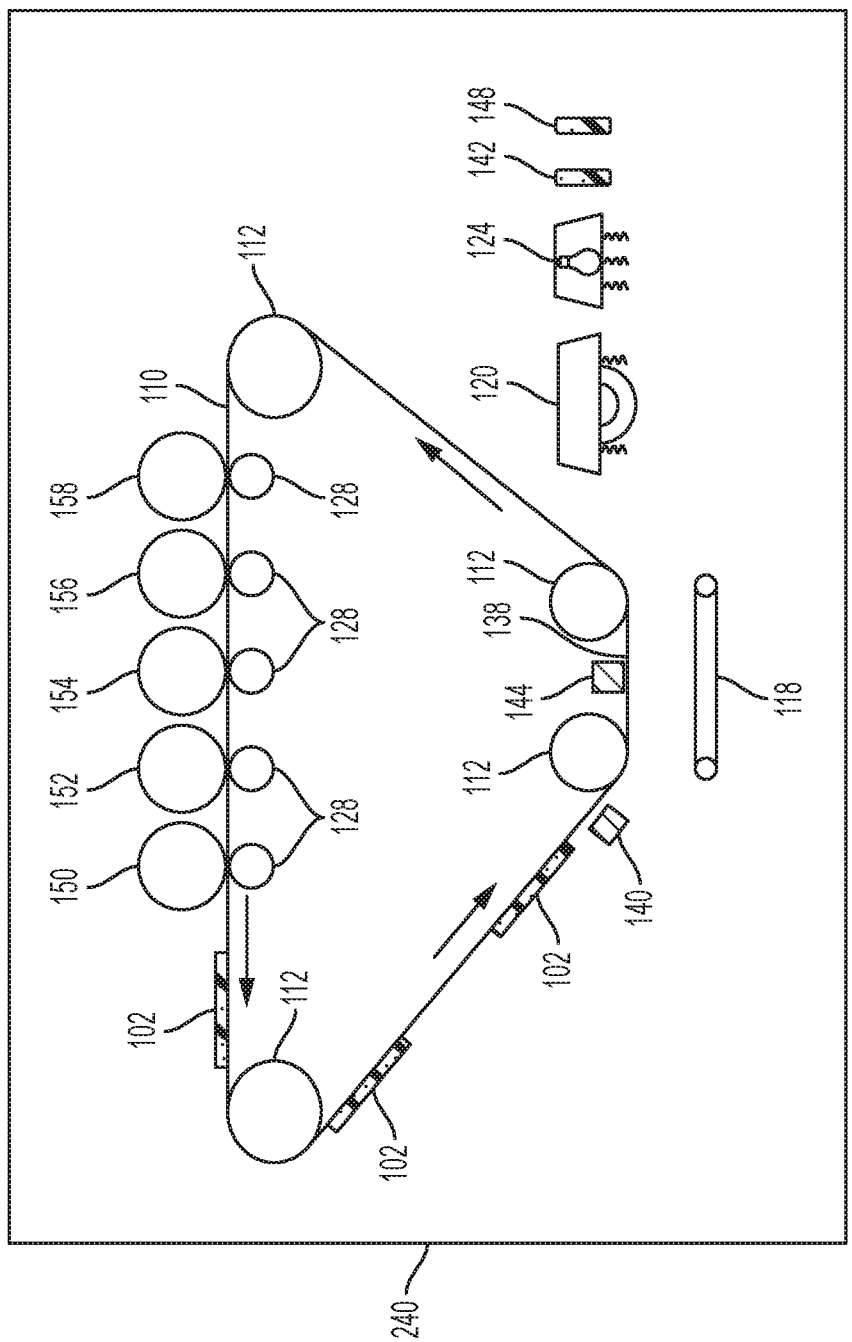
FIG. 26 is a schematic cross-section diagram partially illustrating devices herein.

The one or more printing engines 240 are intended to illustrate any marking device that applies build and support materials (toner, etc.) whether currently known or developed in the future and can include, for example, devices that use an intermediate transfer belt 110 (as shown in FIG. 26).

Thus, as shown in FIG. 26, each of the printing engine(s) 240 shown in FIG. 25 can utilize one or more potentially different (e.g., different color, different material, etc.) build material development stations 152-158, one or more potentially different support material development stations 150, etc. The development stations 150-158 can be any form of development station, whether currently known or developed in the future, such as individual electrostatic marking stations, individual inkjet stations, individual dry ink stations, etc. Each of the development stations 150-158 transfers a pattern of material to the same location of the intermediate transfer belt 110 in sequence during a single belt rotation (potentially independently of a condition of the intermediate transfer belt 110) thereby, reducing the number of passes the intermediate transfer belt 110 must make before a full and complete image is transferred to the intermediate transfer belt 110. While FIG. 22 illustrates five development stations adjacent or in contact with a rotating belt (110), as would be understood by those ordinarily skilled in the art, such devices could use any number of marking stations (e.g., 2, 3, 5, 8, 11, etc.).

Figure 27:
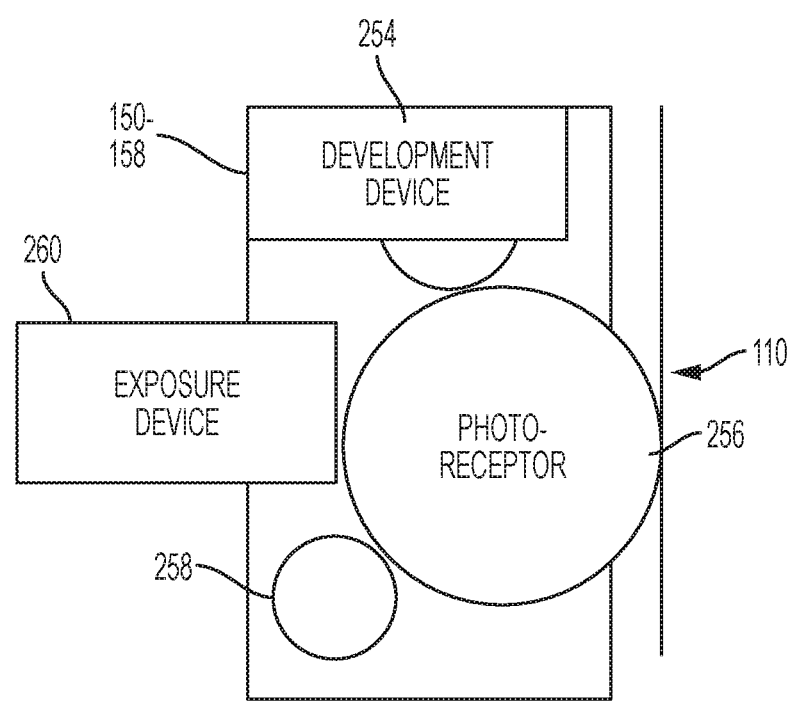
FIG. 27 is a schematic cross-section diagram partially illustrating development devices herein.

One exemplary individual electrostatic development station 150-158 is shown in FIG. 27 positioned adjacent to (or potentially in contact with) intermediate transfer belt 110. Each of the individual electrostatic development stations 150-158 includes its own charging station 258 that creates a uniform charge on an internal photoreceptor 256, an internal exposure device 260 that patterns the uniform charge into a patterned charge on the photoreceptor, and an internal development device 254 that transfers build or support material to the photoreceptor 256.

Figure 28:
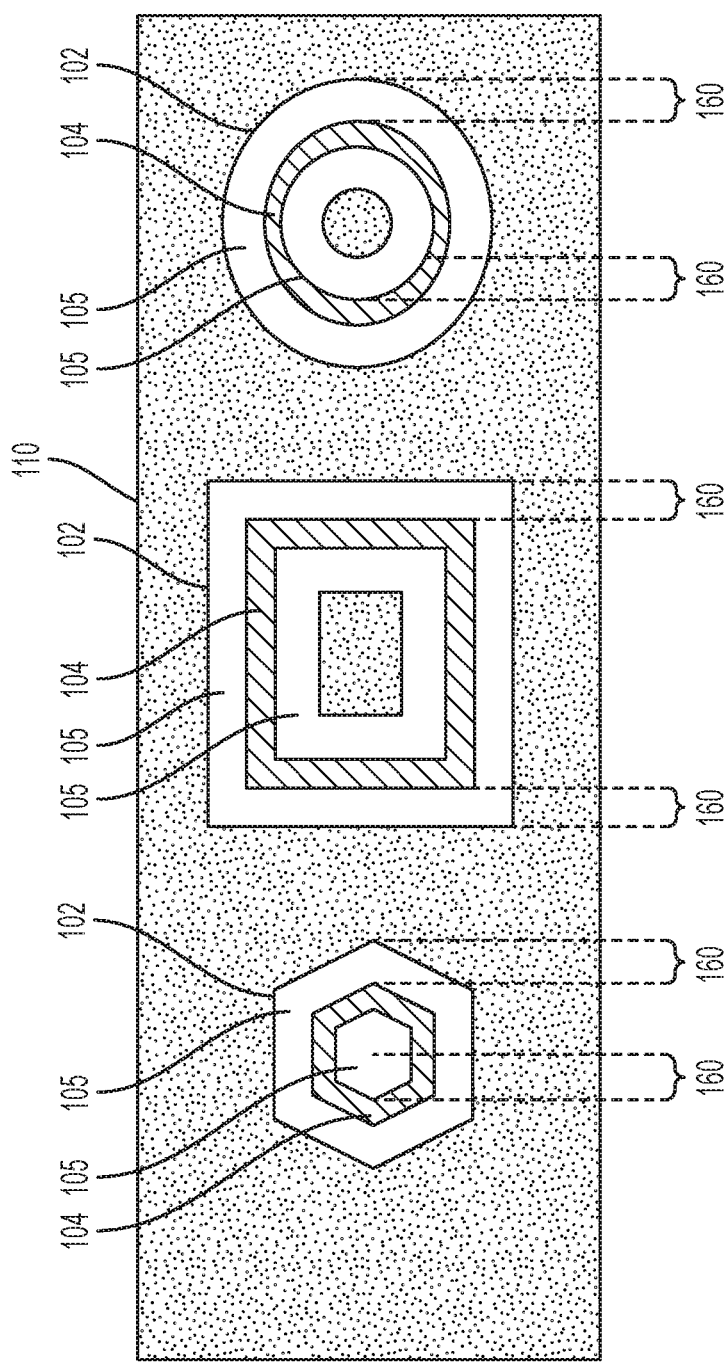
FIG. 28 is a schematic top-view diagram illustrating developed layers on an intermediate transfer surface produced by methods and devices herein.

Additionally, in order to conserve the amount of support material 105 used but still allow the support material 105 to prevent the pattern of build material 104 from being disturbed, the second development station 150 can form the pattern of support material 105 that surrounds the build material 104 to only have a specific thickness (where this "specific thickness" is measured in a direction parallel to said intermediate transfer surface) and to not be thicker or thinner than the specific thickness. For example, as shown in FIG. 28, various patterned layers 102 of build material 104 surrounded by a minimum thickness 160 of support material 105 can be developed on the intermediate transfer surface 110 by the development devices 150-158.

The acoustic energy output by the acoustic transmission device 144 may cause the outer areas of the layer 102 to disperse somewhat as they are transferred to the platen 118. Therefore, the thickness 160 (in the direction parallel to the surface of the intermediate transfer surface 110) of the support material 105 should be sufficient to allow some of the support material 105 to be dispersed by the acoustic energy, without allowing the pattern of build material 104 to be changed or affected by the acoustic energy. However, the thickness 160 of the support material 105 should be controlled to avoid using an excess amount of support material. Therefore, FIG. 28 illustrates that the pattern of support material 105 that surrounds the build material 104 has a uniform specific thickness 160. Thus, with methods and devices herein, just enough support material 105 is used around the build material 104 to keep the build material in the pattern created by the first development station (152-158), at least through the processing point where the build material 104 is transferred off the intermediate transfer surface 110.

Figure 29:
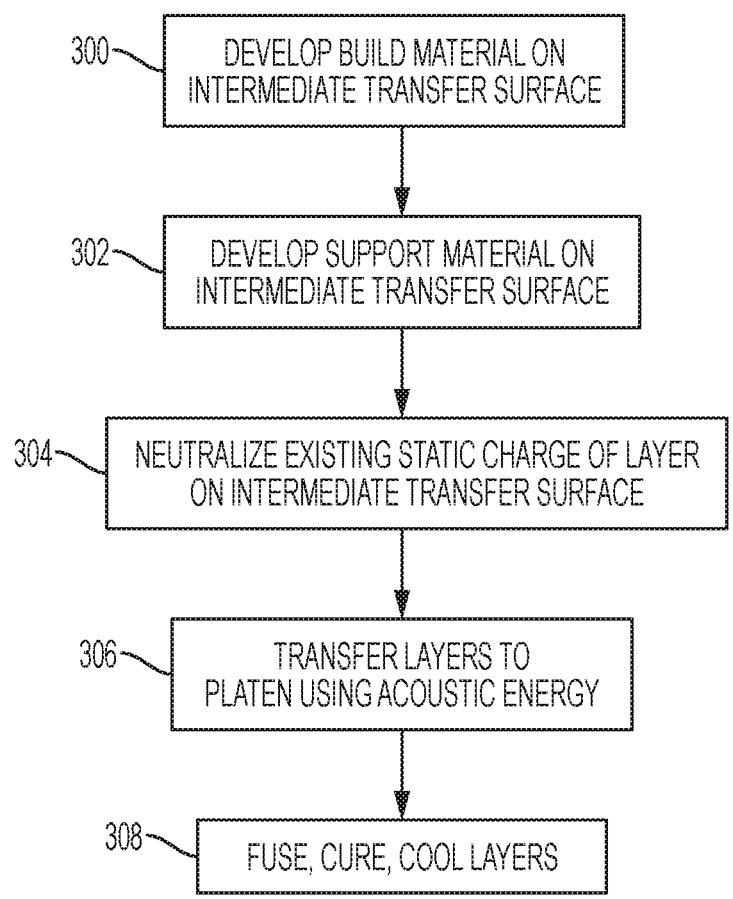
FIG. 29 is a flow diagram illustrating methods herein.

FIG. 29 is a flowchart showing methods provided herein. Such exemplary three-dimensional (3-D) printing methods electrostatically transfer build material to an intermediate transfer surface using a first development station (300), and electrostatically transfer support material to a location of the intermediate transfer surface where the build material is located on the intermediate transfer surface, using a second development station (302).

More specifically, when developing the support material in item 302, these methods control the second development station to form a pattern of the support material around the build material within each of the layers to have a minimum thickness. The minimum thickness is in a direction parallel to the intermediate transfer surface. Also, in item 302, these methods can control the second development station to form the pattern of the support material around the build material to only have the uniform thickness, and to not be thicker or thinner than the uniform thickness.

In item 304, such methods can also output an opposite charge to neutralize existing static charge on a layer of the build material and the support material on the intermediate transfer surface, before the layer reaches a transfer station. As noted above, the transfer station can include, for example, at least one roller on a first side of the intermediate transfer surface, supporting the intermediate transfer surface, and a transmission device on the first side of the intermediate transfer surface. The charge neutralizer is on a second side of the intermediate transfer surface, and the first side is opposite the second side.

In item 306, such methods move a platen to contact the intermediate transfer surface. The intermediate transfer surface transfers a layer to the platen each time the platen contacts the second side of the intermediate transfer surface at the transfer station to successively form layers of the build material and the support material on the platen.

Additionally, in item 306, these methods output acoustic energy (waves) from the transmission device to cause the layer to move from the intermediate transfer surface to the platen, or to the existing layers on the platen. More specifically, the transmission device is an acoustic device vibrating the intermediate transfer surface using acoustic waves, and these methods can control the transmission device to physically vibrate the layers off the intermediate transfer surface and on to the platen, or on to the layers on the platen in item 306.

After transfer, in item 308, such methods can use a heater to heat the layers to join each of the layers together after the layers have been transferred to the platen by the transfer station and/or a use a pressure roller to press each of the layers together after the layers have been transferred to the platen by the transfer station. Further, these methods can use a curing station to apply light to the layers to cure the layers to one another on the platen. Additionally, in item 308, such methods can apply a solvent that dissolves the support material (without affecting the build material) to leave the layers made of only the build material.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

As shown in U.S. Pat. No. 8,488,994, an additive manufacturing system for printing a 3-D part using electrophotography is known. The system includes a photoconductor component having a surface, and a development station, where the development station is configured to developed layers of a material on the surface of the photoconductor component. The system also includes a transfer medium configured to receive the developed layers from the surface of the rotatable photoconductor component, and a platen configured to receive the developed layers from the transfer component in a layer-by-layer manner to print the 3-D part from at least a portion of the received layers.

With respect to UV curable toners, as disclosed in U.S. Pat. No. 7,250,238 it is known to provide a UV curable toner composition, as are methods of utilizing the UV curable toner compositions in printing processes. U.S. Pat. No. 7,250,238 discloses various toner emulsion aggregation processes that permit the generation of toners that in embodiments can be cured, that is by the exposure to UV radiation, such as UV light of has about 100 nm to about 400 nm. In U.S. Pat. No. 7,250,238, the toner compositions produced can be utilized in various printing applications such as temperature sensitive packaging and the production of foil seals. In U.S. Pat. No. 7,250,238 embodiments relate to a UV curable toner composition comprised of an optional colorant, an optional wax, a polymer generated from styrene, and acrylate selected from the group consisting of butyl acrylate, carboxyethyl acrylate, and a UV light curable acrylate oligomer. Additionally, these aspects relate to a toner composition comprised of a colorant such as a pigment, an optional wax, and a polymer generated from a UV curable cycloaliphatic epoxide.

Moreover, U.S. Pat. No. 7,250,238 discloses a method of forming a UV curable toner composition comprising mixing a latex containing a polymer formed from styrene, butyl acrylate, a carboxymethyl acrylate, and a UV curable acrylate with a colorant and wax; adding flocculant to this mixture to optionally induce aggregation and form toner precursor particles dispersed in a second mixture; heating the toner precursor particles to a temperature equal to or higher than the glass transition temperature (Tg) of the polymer to form toner particles; optionally washing the toner particles; and optionally drying the toner particles. A further aspect relates to the toner particles produced by this method.

While some exemplary structures are illustrated in the attached drawings, those ordinarily skilled in the art would understand that the drawings are simplified schematic illustrations and that the claims presented below encompass many more features that are not illustrated (or potentially many less) but that are commonly utilized with such devices and systems. Therefore, Applicants do not intend for the claims presented below to be limited by the attached drawings, but instead the attached drawings are merely provided to illustrate a few ways in which the claimed features can be implemented.

Many computerized devices are discussed above. Computerized devices that include chip-based central processing units (CPU's), input/output devices (including graphic user interfaces (GUI), memories, comparators, tangible processors, etc.) are well-known and readily available devices produced by manufacturers such as Dell Computers, Round Rock Tex., USA and Apple Computer Co., Cupertino Calif., USA. Such computerized devices commonly include input/output devices, power supplies, tangible processors, electronic storage memories, wiring, etc., the details of which are omitted herefrom to allow the reader to focus on the salient aspects of the systems and methods described herein. Similarly, printers, copiers, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well-known and are not described in detail herein to keep this disclosure focused on the salient features presented. The systems and methods herein can encompass systems and methods that print in color, monochrome, or handle color or monochrome image data. All foregoing systems and methods are specifically applicable to electrostatographic and/or xerographic machines and/or processes.

For the purposes of this invention, the term fixing means the drying, hardening, polymerization, crosslinking, binding, or addition reaction or other reaction of the coating. In addition, terms such as "right", "left", "vertical", "horizontal", "top", "bottom", "upper", "lower", "under", "below", "underlying", "over", "overlying", "parallel", "perpendicular", etc., used herein are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms automated or automatically mean that once a process is started (by a machine or a user), one or more machines perform the process without further input from any user. In the drawings herein, the same identification numeral identifies the same or similar item.

It will be appreciated that the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims. Unless specifically defined in a specific claim itself, steps or components of the systems and methods herein cannot be implied or imported from any above example as limitations to any particular order, number, position, size, shape, angle, color, or material.

What is claimed is:

1. A three-dimensional (3-D) printer comprising:
an intermediate transfer belt;
a first development station configured to electrostatically transfer build material to one side of said intermediate transfer belt;
a second development station configured to electrostatically transfer support material to a location of said one side of said intermediate transfer belt where said build material is located, said first and second development stations in turn forming sequential layers of the electrostatically transferred build and support material on said one side of said intermediate transfer belt, and said support material being dissolvable in solvents that do not affect said build material;
a charge neutralizer arranged facing said one side of said intermediate transfer belt and configured to output an opposite charge neutralizing an existing static charge on each of said layers of build and support material arranged on said one side of said intermediate transfer belt;
a transfer station comprising a transmission device arranged on a back side of said intermediate transfer belt opposite said one side; and
a platen repeatedly moving through said transfer station relative to said intermediate transfer belt, said 3-D printer configured such that:
one of said charge neutral layers is transferred to said platen in correspondence with each of said repeated movements of said platen through said transfer station so as to successively transfer each of said charge neutral layers of said build and support material onto said platen across a transfer gap defined in said transfer station between the intermediate transfer belt and either of said platen or one more of said layers previously transferred onto said platen, and
said transmission device outputs acoustic waves so as to conduct said successive transfer by causing each of said charge neutral layers, without using electrostatic charges and without adding heat to any of the layers, to move across said gap from said intermediate transfer belt onto either of said platen or onto said one or more layers previously transferred onto said platen.

2. The 3-D printer according to claim 1, said transmission device physically vibrating said layers off said intermediate transfer belt for said transfer thereof across said gap.

3. The 3-D printer according to claim 1, said second development station forming a pattern of said support material around said build material within each of said layers to have a specific thickness, said specific thickness being in a direction parallel to said intermediate transfer belt.

4. The 3-D printer according to claim 3, said second development station forming said pattern of said support material around said build material to only have said specific thickness, and to not be thicker or thinner than said specific thickness.

5. The 3-D printer according to claim 1, further comprising a support material removal station configured to receive said platen to which each of said layers has been transferred, said support material removal station applying one of said solvents to dissolve said support material without affecting said build material so as to leave an object formed only of said build material of said layers.

6. The 3-D printer according to claim 1, each of said layers being arranged on a discrete area on said first side of said intermediate transfer belt and being in a pattern corresponding to components in that respective layer of a three-dimensional object being formed collectively by all of the sequential layers.

7. The 3 printer according to claim 1, further comprising:
a heater configured to heat said layers transferred to said platen and join each of said layers together after said layers are transferred to said platen at said transfer station;
a pressure roller configured to press each of said layers together after said layers are transferred to said platen at said transfer station; and
a curing station configured to apply light to said layers transferred to said platen so as to cure said layers to one another on said platen.

* * * * *